Figure 1:
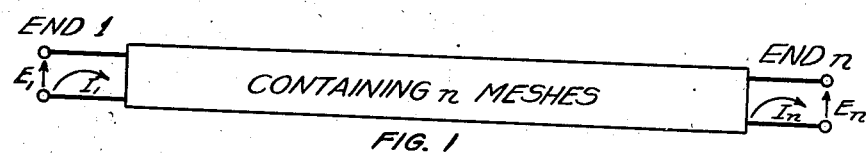

Jan. 12, 1937.                C. M:SON GEWERTZ                2,067,443
                               ELECTRICAL NETWORK
                               Filed May 5, 1932            5 Sheets-Sheet 1

THE SHADED AREA IS THE PROJECTION OF
THE CUT OFF PARABOLOID TO CONSIDER

P = CENTRE OF THE PARABOLOID

INVENTOR
CHARLES M:SON GEWERTZ
PER
ATTORNEY

Jan. 12, 1937.  C. M:SON GEWERTZ  2,067,443
ELECTRICAL NETWORK
Filed May 5, 1932  5 Sheets-Sheet 2

INVENTOR
CHARLES M:SON GEWERTZ
PER
ATTORNEY

Jan. 12, 1937. C. M:SON GEWERTZ 2,067,443
ELECTRICAL NETWORK
Filed May 5, 1932   5 Sheets-Sheet 3

INVENTOR
CHARLES M:SON GEWERTZ
PER
ATTORNEY

Jan. 12, 1937.    C. M:SON GEWERTZ    2,067,443
ELECTRICAL NETWORK
Filed May 5, 1932    5 Sheets-Sheet 4
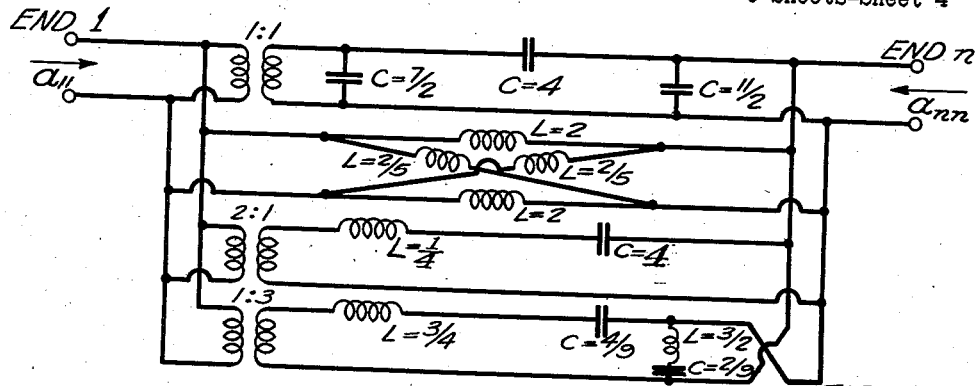
FIG. 20
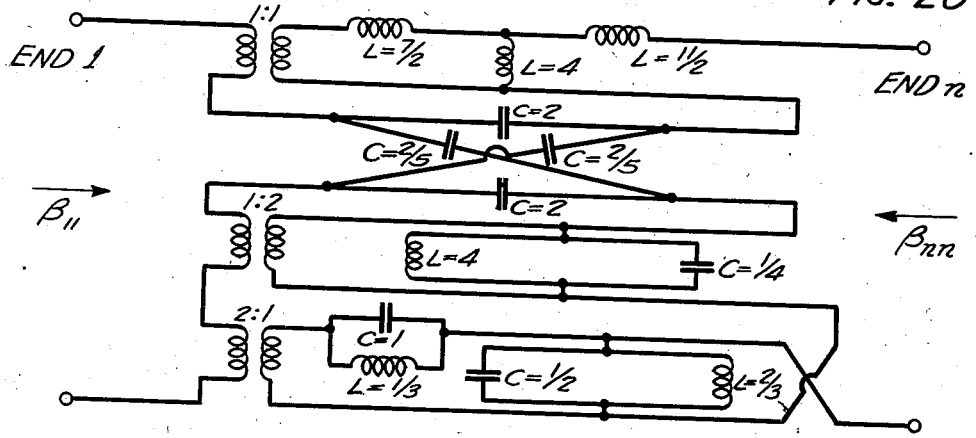
FIG. 21
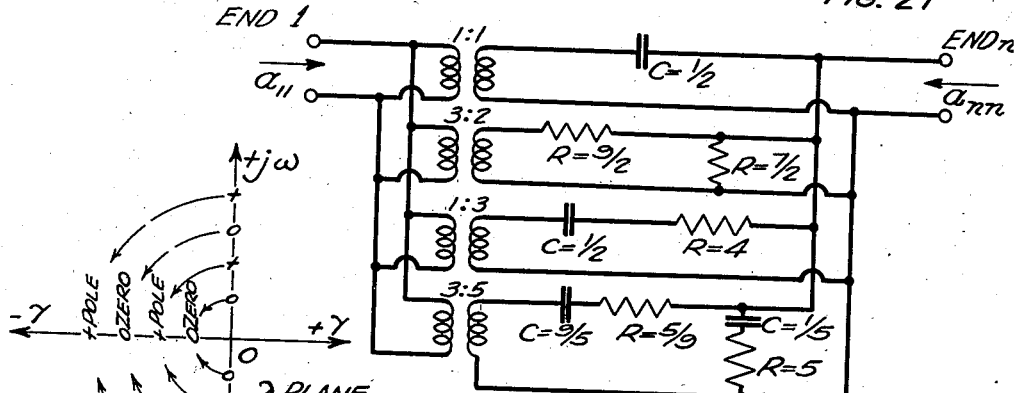
FIG. 22
FIG. 23
INVENTOR
CHARLES M:SON GEWERTZ
PER
ATTORNEY Jan. 12, 1937.   C. M:SON GEWERTZ   2,067,443
ELECTRICAL NETWORK
Filed May 5, 1932   5 Sheets-Sheet 5

INVENTOR
CHARLES M:SON GEWERTZ
PER
ATTORNEY

Patented Jan. 12, 1937

2,067,443

UNITED STATES PATENT OFFICE 2,067,443

ELECTRICAL NETWORK

Charles M:son Gewertz, Cambridge, Mass.

Application May 5, 1932, Serial No. 609,428

28 Claims. (Cl. 178—44)

The present invention relates to electrical networks and more particularly to four-terminal networks having certain prescribed characteristics.

The principal object of the present invention is to provide a finite, purely reactive or dissipative, electrical four-terminal network whose two short-circuit driving-point admittances and short-circuit transfer admittance—or—two open-circuit driving-point impedances and open-circuit transfer impedance are prescribed functions of frequency.

Such a network, which has been wanted for a long period of time, is applicable to the solution of numerous problems arising in the field of electrical communication engineering and naturally it is also applicable to power engineering, where one single frequency is considered.

It may, for example, be required to join together two systems of communication circuits each having definite admittances (or impedances) by means of a four-terminal network having preassigned driving point admittances (or impedances) and transfer admittance (or impedance) in order to improve the desired electrical properties of the circuit in some way and secure the most desirable operation of the circuit as a whole.

On the other hand, it may be required to change the alternating current admittance (or impedance) of a system, in which case a four-terminal network having preassigned admittances (or impedances) may have to be connected in parallel or series—(or perhaps in chain connection) with it, etc.

Further, it may be desired to design a finite four-terminal network equivalent to a transmission line.

A four-terminal network may be used as a two-terminal network and in such a case the same network offers four driving-point admittances (impedances),—two for short circuit and two for open-circuit at the opposite end.

If the two short-circuit driving-point admittances (impedances), say, are prescribed, then we can readily select the short-circuit transfer admittance such that the necessary and sufficient conditions, to be stated in the following, are met with, whereupon we can apply one of my general methods of realization and build the network.

When used as a two-terminal network, a four-terminal network obtained from prescribed driving-point admittance or impedance functions can be used for solving the three general types of problems stated by T. C. Fry in his U. S. Patent 1,570,215, page 1, dealing with a two-terminal electrical network having preassigned driving-point impedance-function.

The three types of problems referred to are:

(1) The design of a balancing network employed, for example, in two-way repeater circuits.

(2) The design of a network having a prescribed driving-point impedance such that when two component parts of a circuit are adapted to one another the electrical properties of the circuit as a whole are improved; for instance, the reflection losses are decreased.

(3) The design of a network having such properties that it can be used for correcting for the distortion which a signal may experience when transmitted through a given system due to the unavoidable addition of appropriate apparatus at the sending or the receiving end. Here we need a network having such a prescribed impedance that the output current of the distorting system when connected to this impedance will be of the same wave form as the input E. M. F. of the system.

It will be apparent that there are also many other types of problems (for instance, related to relay circuits) to which my networks are applicable, but these need not be discussed here.

The networks according to the present invention have numerous advantages over the networks heretofore available. Practically all known methods in designing corrective and selective networks are based on continuous approximation methods and in order to get a satisfactory result more and more sections have to be added. The network obtained by applying my general methods is, however, in all cases an exact realization of the prescribed functions. It contains, furthermore, a finite number of meshes and elements. These elements are all positive, i. e. the network is passive. In addition the network is believed to require the minimum number of elements for the prescribed conditions.

Further, it is only necessary to find the three short-circuit admittances or the three open-circuit impedances from the propagation function, generated from its amplitude frequency characteristic, and two characteristic impedances, whereupon my general methods can always be applied for the design of corrective (amplitude corrective or phase corrective networks or possibly networks which make both corrections simultaneously) and selective (electric filter networks) networks of any kind.

In practice the propagation curve and two characteristic impedances may be prescribed, in which case the first step would be to find an $\omega$-function (where $\omega$ is $=2\pi$ times frequency) as a quotient of two integral polynomials fitting this curve and then, as indicated above, this function may generate the propagation function itself, whereupon, after that the corresponding three short-circuit admittances or three open-circuit impedances are found, a four-terminal network having such properties that it "answers" in a prescribed manner to an applied E. M. F. of any frequency can then be designed by the aid of my general methods.

Having the three short-circuit admittances or the three open-circuit impedances given, my general methods of design furnish a possibility to go straight to the point and a compact finite four-terminal network, which embodies the preassigned requirements directly and mathematically exactly, is obtained.

In general my networks are composed of a plurality of component networks connected together in series, when representing impedance functions, or in parallel, when representing admittance functions. This specification deals with functions leading to a network containing only two kinds of elements. In my co-pending application, Serial No. 609,429, I give further methods for synthesizing four-terminal networks, including those which contain all three kinds of elements, i. e. inductance, capacitance and resistance.

Figure 2:
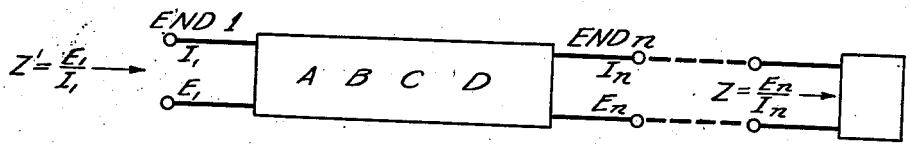
Figure 4:
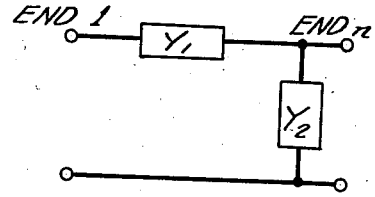
Figure 3:
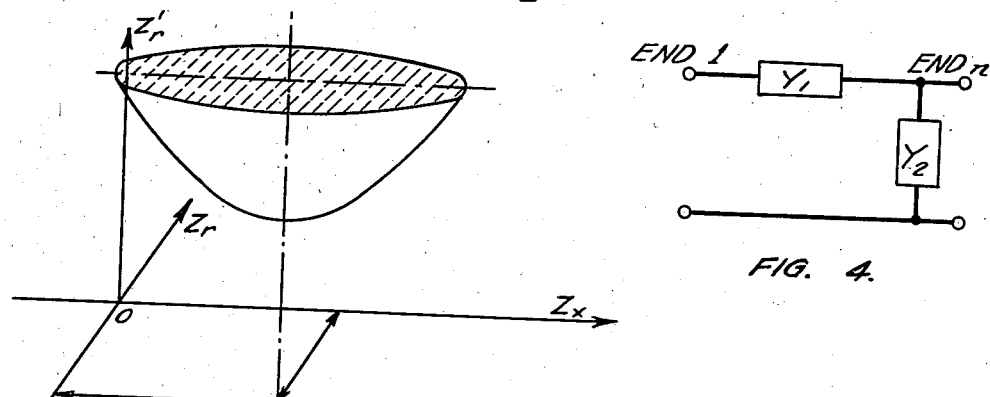
Figure 5:
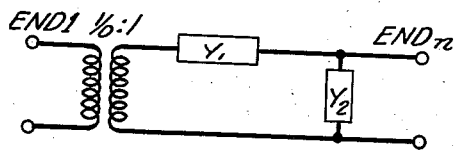
Figure 6:
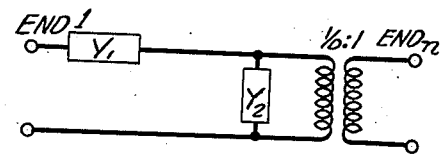
Figure 7:
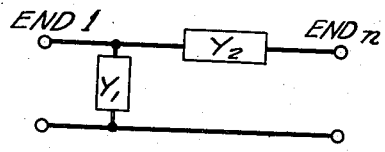
Figure 8:
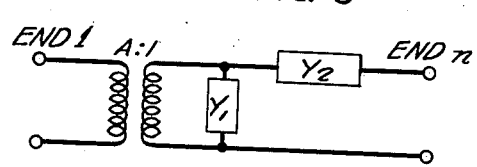
Figure 9:
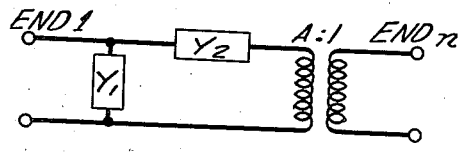
Figure 10:
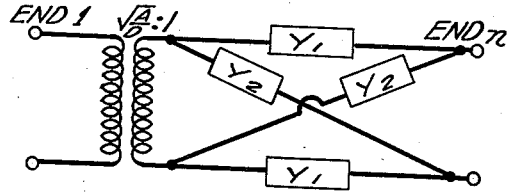
Figure 11:
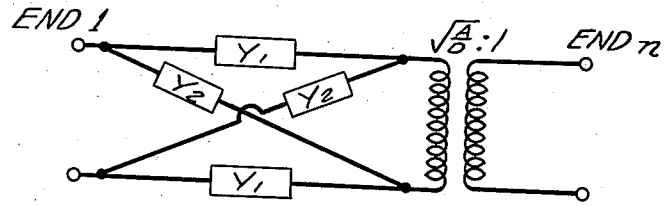
Figure 12:
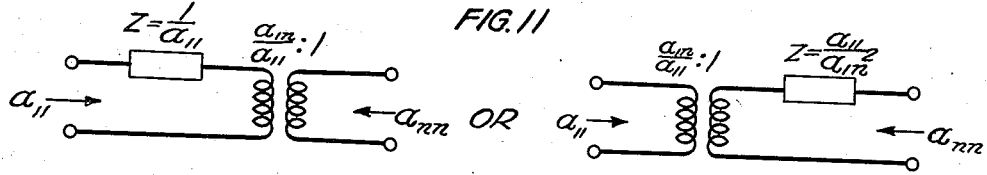
Figure 13:
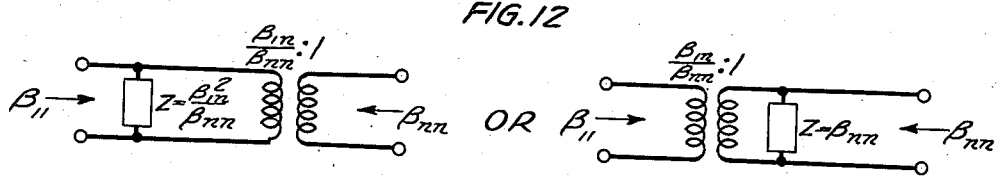
Figure 14:
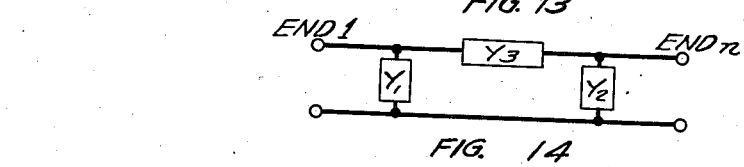
Figure 15:
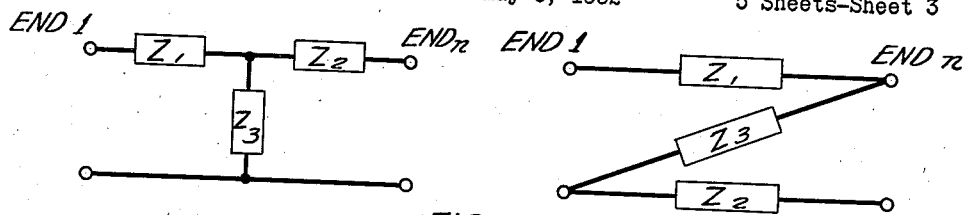
Figures 16, 17:
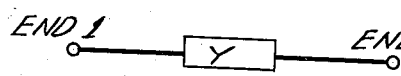
Figure 18:
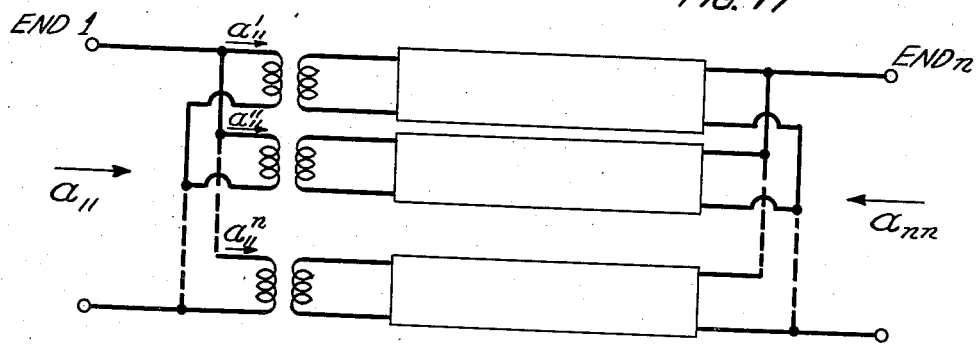
Figure 19:
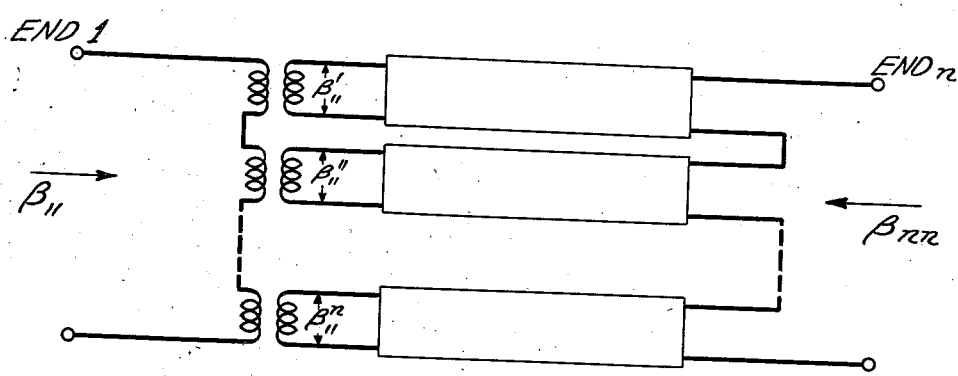
Figure 24:
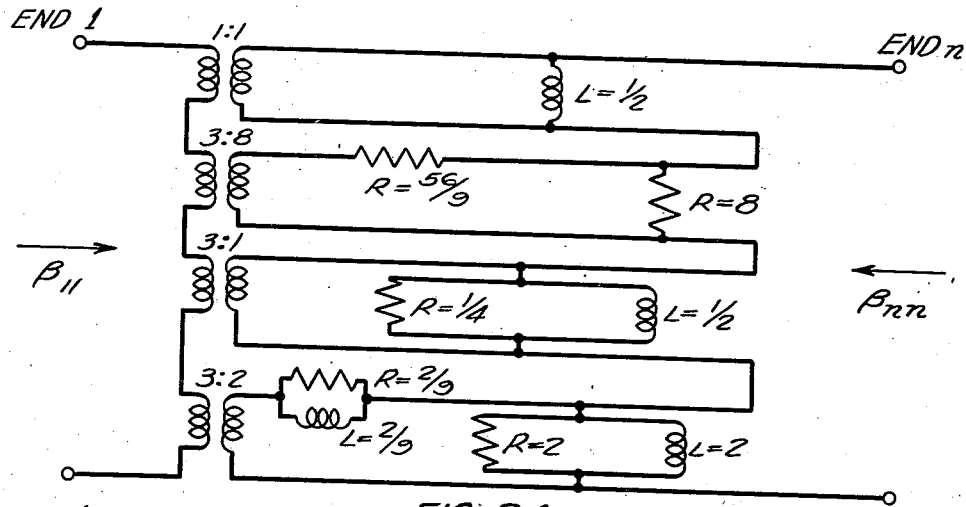
Figure 25:
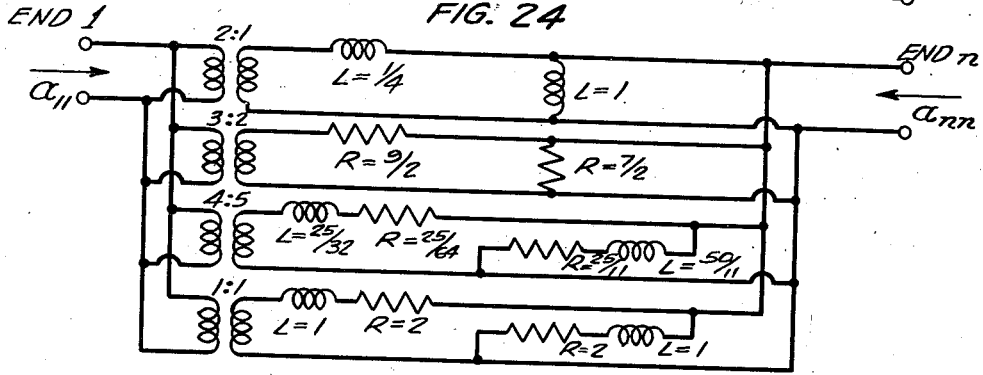

Further details of my invention may be obtained from the following detailed description and the accompanying drawings, in which Fig. 1 represents a finite passive four-terminal network containing $n$ meshes; Fig. 2 represents a four-terminal network terminated in a passive two-terminal network; Fig. 3 is a graph of the equation representing the real part of the impedance $Z'$ of the network of Fig. 2; Fig. 4 represents a component network termed an L-structure; Fig. 5 represents a four-terminal component network comprising a transformer and an L-structure; Fig. 6 represents a four-terminal component network comprising an L-structure and a transformer; Fig. 7 represents a component L-structure network; Fig. 8 represents a four-terminal component network comprising a transformer and an L-structure; Fig. 9 represents a four-terminal component network comprising an L-structure and a transformer; Fig. 10 represents a four-terminal component network comprising a transformer and a lattice structure; Fig. 11 represents a four-terminal component network comprising a lattice structure and a transformer; Figs. 12 and 13 represent further component networks having transformers; Fig. 14 shows a $\Pi$-structure component network; Fig. 15 represents a T-structure component network; Fig. 16 represents a component network whose short-circuit driving-point and transfer admittances are all equal; Fig. 17 represents a component network whose open-circuit driving-point and transfer impedances are all equal; Fig. 18 is a general representation of a four-terminal network comprising a plurality of component four-terminal networks in parallel; Fig. 19 is a general representation of a four-terminal network comprising a plurality of component four-terminal networks in series; Figs. 20, 21, 23, 24, 25 and 26 illustrate realizations of numerical examples, according to methods shown on pp. 8–11; Fig. 22 is a diagram indicating a transformation of the location of the zeros and poles of a prescribed function.

Methods of design

The following sections give methods for the design of component networks as well as how to find the total network representation of the total prescribed functions.

Suppose we have a passive four-terminal network containing $n$ meshes, as indicated in Fig. 1. Assume the applied voltages at the respective ends to be sinusoidal, of the form $E_k e^{j\omega t}$. Then, as the currents must be of the same form, i. e. $I e^{j\omega t}$, the well-known Kirchhoff's equations for said network are:

$$\left. \begin{array}{l} z_{11}I_1+z_{12}I_2+z_{13}I_3+\ldots+z_{1n}I_n=E_1 \\ z_{21}I_1+z_{22}I_2+z_{23}I_2+\ldots+z_{2n}I_n=0 \\ z_{31}I_1+\ldots\ldots\ldots\ldots\ldots=0 \\ \ldots\ldots\ldots\ldots\ldots\ldots\ldots\ldots \\ z_{n1}I_1+z_{n2}I_2+z_{n3}I_3+\ldots+z_{nn}I_n=-E_n \end{array} \right\} \quad (1)$$

where:

$$z_{rs}=z_{sr}=R_{sr}+L_{sr}p+\frac{S_{sr}}{p};\ \left(S_{sr}=\frac{1}{C_{sr}}\right)$$

$R$, $L$ and $C$ are the three kinds of network elements, i. e. capacitance, inductance and resistance, $$p=\frac{d}{dt}$$

$\omega=2\pi$ times the frequency

Letting $D$ be the determinant of the $z$:s, i. e.

$$D=\begin{vmatrix} z_{11} z_{12} & \ldots & z_{1n} \\ z_{21} z_{33} & \ldots & \\ \ldots\ldots & & \\ z_{n1} z_{n2} & \ldots & z_{nn} \end{vmatrix}$$

and $M_{sr}$ be the corresponding minor of the $s^{\text{th}}$ row and the $r^{\text{th}}$ column, i. e. for instance:

$$M_{11}=\begin{vmatrix} z_{22} & z_{23} & \ldots & z_{2n} \\ z_{32} & z_{33} & \ldots & \\ \ldots\ldots & & & \\ z_{n2} & z_{n3} & \ldots & z_{nn} \end{vmatrix}(-1)^{1+1}$$

then, when solving for the currents in the 1st and $n^{\text{th}}$ mesh, being the only ones which interest us, we get, by the aid of Cramer's rule:

$$\left. \begin{array}{l} I_1=\frac{M_{11}}{D}E_1+0+0+\ldots-\frac{M_{n1}}{D}E_n \\ I_n=\frac{M_{1n}}{D}E_1+0+0+\ldots-\frac{M_{nn}}{D}E_n \end{array} \right\} \quad (2)$$

For short-circuit at the respective ends the corresponding voltages become zero and when writing equations (2) as $$\left. \begin{array}{l} I_1=\alpha_{11}E_1-\alpha_{1n}E_n \\ I_n=\alpha_{1n}E_1-\alpha_{nn}E_n \end{array} \right\} \quad (3)$$

and knowing that, when dealing with quantities obtained at end $n$, either the sign of the two end currents or of the two end voltages have to be reversed, then we see that:

$$\alpha_{11}=\frac{M_{11}}{D}=\frac{I_1}{E_1}$$

is the short-circuit driving-point admittance at end 1, $$\alpha_{nn}=\frac{M_{nn}}{D}=\frac{I_n}{E_n}$$

is the short-circuit driving-point admittance at end $n$, and—

$$\alpha_{1n}=\frac{M_{n1}}{D}=\frac{M_{1n}}{D}=\frac{I_1}{E_n}=\frac{I_n}{E_1}$$

is the short-circuit transfer admittance between the two ends.

When solving for the two voltages contained in (3) we get:

$$\left. \begin{array}{l} E_1=\frac{\alpha_{nn}}{\alpha_{11}\alpha_{nn}-\alpha_{1n}^2}I_1-\frac{\alpha_{1n}}{\alpha_{11}\alpha_{nn}-\alpha_{1n}^2}I_n \\ E_n=\frac{\alpha_{1n}}{\alpha_{11}\alpha_{nn}-\alpha_{1n}^2}I_1-\frac{\alpha_{11}}{\alpha_{11}\alpha_{nn}-\alpha_{1n}^2}I_n \end{array} \right\} \quad (4)$$

For open-circuit at the respective ends the corresponding currents become zero, and when writing (4) as:

$$E_1 = \beta_{11}I_1 - \beta_{1n}I_n \\ E_n = \beta_{1n}I_1 - \beta_{nn}I_n \quad (5)$$

and applying the sign rule, then we see that:

$$\beta_{11} = \frac{E_1}{I_1}$$

is the open-circuit driving-point impedance at end 1.

$$\beta_{nn} = \frac{E_n}{I_n}$$

is the open-circuit driving-point impedance at end $n$.

$$\beta_{1n} = \frac{E_1}{I_n} = \frac{E_n}{I_1}$$

is the open-circuit transfer impedance between the two ends.

Again, solving for the two currents contained in (5), we get:

$$I_1 = \frac{\beta_{nn}}{\beta_{11}\beta_{nn} - \beta_{1n}^2} E_1 - \frac{\beta_{1n}}{\beta_{11}\beta_{nn} - \beta_{1n}^2} E_n \\ I_n = \frac{\beta_{1n}}{\beta_{11}\beta_{nn} - \beta_{1n}^2} E_1 - \frac{\beta_{11}}{\beta_{11}\beta_{nn} - \beta_{1n}^2} E_n \quad (6)$$

i. e. we are back to (3).

Consequently, between the $\alpha$:s and the $\beta$:s the following relations hold:

$$\alpha_{11} = \frac{\beta_{nn}}{\beta_{11}\beta_{nn} - \beta_{1n}^2} \\ \alpha_{nn} = \frac{\beta_{11}}{\beta_{11}\beta_{nn} - \beta_{1n}^2} \\ \alpha_{1n} = \frac{\beta_{1n}}{\beta_{11}\beta_{nn} - \beta_{1n}^2} \quad (7)$$

and:

$$\beta_{11} = \frac{\alpha_{nn}}{\alpha_{11}\alpha_{nn} - \alpha_{1n}^2} \\ \beta_{nn} = \frac{\alpha_{11}}{\alpha_{11}\alpha_{nn} - \alpha_{1n}^2} \\ \beta_{1n} = \frac{\alpha_{1n}}{\alpha_{11}\alpha_{nn} - \alpha_{1n}^2} \quad (8)$$

Equations (7) and (8) reveal the interesting fact that generally the $\alpha$:s and $\beta$:s, from a purely mathematical point of view, simply are elements of two non-singular inverse square matrices the product of which is equal to the unit matrix, often called idemfactor.

The prescribed matrix may be singular, however, in which case Equations (7) and (8) do not apply, but also in this case the situation can readily be handled and the singular matrix can be realized (see Charles M: son Gewertz, "Network Synthesis", The Williams and Wilkins Co., Baltimore, Md., pp. 186–193).

The four general circuit "constants", which in our case will be called the four general circuit parameters because they, when referring to a four-terminal communication network, are not constants but functions of frequency, are usually defined by the equations:

$$E_1 = AE_n + BI_n \\ I_1 = CE_n + DI_n \quad (9)$$

On the other hand, when solving for $E_1$ and $I_1$ from Equations (3) we get:

$$E_1 = \frac{\alpha_{nn}}{\alpha_{1n}} E_n + \frac{1}{\alpha_{1n}} I_n \\ I_1 = \frac{\alpha_{11}\alpha_{nn} - \alpha_{1n}^2}{\alpha_{1n}} E_n + \frac{\alpha_{11}}{\alpha_{1n}} I_n \quad (10)$$

and when solving for the same voltage and current from (5), we get:

$$E_1 = \frac{\beta_{11}}{\beta_{1n}} E_n + \frac{\beta_{11}\beta_{nn} - \beta_{1n}^2}{\beta_{1n}} I_n \\ I_1 = \frac{1}{\beta_{1n}} E_n + \frac{\beta_{nn}}{\beta_{1n}} I_n \quad (11)$$

Comparing Equations (10) and (11) with (9), we have:

$$A = \frac{\alpha_{nn}}{\alpha_{1n}} = \frac{\beta_{11}}{\beta_{1n}} \\ B = \frac{1}{\alpha_{1n}} = \frac{\beta_{11}\beta_{nn} - \beta_{1n}^2}{\beta_{1n}} \\ C = \frac{\alpha_{11}\alpha_{nn} - \alpha_{1n}^2}{\alpha_{1n}} = \frac{1}{\beta_{1n}} \\ D = \frac{\alpha_{11}}{\alpha_{1n}} = \frac{\beta_{nn}}{\beta_{1n}} \quad (12)$$

Using the quotients of the $\alpha$:s (say) in (12) and forming $AD - BC$, we get:

$$\frac{\alpha_{nn}\alpha_{11}}{\alpha_{1n}\alpha_{1n}} - \frac{\alpha_{11}\alpha_{nn} - \alpha_{1n}^2}{\alpha_{1n}\alpha_{1n}}$$

which is equal to $+1$, i. e. between the general circuit parameters the relation:

$$AD - BC = 1 \quad (13)$$

holds.

Further, when forming the product AD in two different ways, we get:

$$\frac{\alpha_{nn}\beta_{nn}}{\alpha_{1n}\beta_{1n}} = \frac{\alpha_{11}\beta_{11}}{\alpha_{1n}\beta_{1n}}$$

i. e.

$$\alpha_{11}\beta_{11} = \alpha_{nn}\beta_{nn} \quad (14)$$

Consequently, the products of the short-circuit driving-point admittance and the open-circuit driving-point impedance at the respective ends of a four-terminal network are equal.

It was stated that each one of the $\alpha$:s and $\beta$:s, because they characterize a four-terminal network having a finite number of meshes, must be prescribed as a rational fraction, as shown below:

$$\alpha_{11} = \frac{g_1(\lambda)}{h(\lambda)} \\ \alpha_{nn} = \frac{g_n(\lambda)}{h(\lambda)} \\ \alpha_{1n} = \frac{g_{1n}(\lambda)}{h(\lambda)} \quad (15)$$

where the $g(\lambda)$:s and $h(\lambda)$:s are rational integral polynomials in $\lambda$ and the variable $\lambda = \gamma + j\omega$ refers to the complex plane; $\omega$ being equal to $2\pi$ times frequency.

Then, when comparing (15) and (8), we see that the $\beta$:s fulfil the same requirement.

Each one of the $\alpha$:s and $\beta$:s must further be real, for real $\lambda$-values, which is the same as saying that for $\omega = 0$ the response vector must be in phase with the impulse vector and both vectors must have the same direction.

Regarding the location of zeros and poles of the driving-point functions, it is known, and can readily be proved by the aid of the Law of Conservation of Energy, that they all must lie in the left half of the complex plane, including the boundary (= the imaginary axis).

As the transfer function ($\alpha_{1n}$ or $\beta_{1n}$, respectively), its poles are generally the same as those of the driving-point functions.

Its zeros, however, are found to make an exception as to their location, and it can be proved that they can lie at any point of the $\lambda$-plane without violating the Law of Conservation of Energy.

From (7) and (8) it is clear that the zeros and poles of the $\alpha$- and $\beta$-determinants must lie within the same region as those of the driving-point functions.

Then we come to the question of positiveness of the real parts of the $\alpha$:s and $\beta$:s and the determinant of the real parts of either set of functions.

The real part of a driving-point function must necessarily be greater than or equal to zero for $\gamma$ greater than or equal to zero, as proved by O. Brune in his article in the Journal of Mathematics and Physics Vol. X No. 3, 1931, p. 191.

As to the transfer function it should be understood that it has no physical meaning in terms of energy flow since it is equal to the quotient of the input voltage and the output current, or vice versa. Thus, its real part is allowed to take on positive as well as negative values, though the ampltiudes of these values are limited by a determinant condition to be shown below.

This determinant condition is obtained in the following manner:

Terminate the four-terminal network in a passive two-terminal network, whose impedance is $Z=Z_r+jZ_x$, as shown in Fig. 2, and consider the whole right half of the $\lambda$-plane.

Form the ratio
$$\frac{E_1}{I_1}$$
from (10), getting:

$$Z'=Z'_r+jZ'_x=\frac{\alpha_{nn}Z+1}{(\alpha_{11}\alpha_{nn}-\alpha_{1n}^2)Z+\alpha_{11}} \quad (16)$$

Split up the $\alpha$:s as:

$$\left.\begin{array}{l}\alpha_{11}=r_1+jx_1\\ \alpha_{nn}=r_n+jx_n\\ \alpha_{1n}=r_{1n}+jx_{1n}\end{array}\right\} \quad (17)$$

Substitute (17) into (16) and solve for the real part ($Z'_r$), getting:

$$Z'_r=\frac{(Z_r^2+Z_x^2)[(r_1r_n-r_{1n}^2)r_n+r_nx_{1n}^2+r_1x_n^2-2x_nr_{1n}x_{1n}]+Z_r(2r_1r_n-r_{1n}^2+x_{1n}^2)+Z_x(2r_{1n}x_{1n}-2r_1x_n)+r_1}{[Z_r(r_1r_n-r_{1n}^2-x_1x_n+x_{1n}^2)-Z_x(r_1x_n+r_nx_1-2r_{1n}x_{1n})+r_1]^2+[Z_r(r_1x_n+r_nx_1-2r_{1n}x_{1n})+Z_x(r_1r_n-r_{1n}^2-x_1x_n+x_{1n}^2)+x_1]^2} \quad (18)$$

The denominator is a sum of two squares and as in the numerator each one of the two squares $Z_r^2$ and $Z_x^2$ have the same coefficient, it is clear that (18) represents the equation of a paraboloid of revolution. Because in addition the $r$:s and $x$:s are functions of $\gamma$ and $\omega$, the paraboloid changes its location above and in respect to the $Z_r$—$Z_x$ plane with the values of the variables, at the same time as its parameter varies.

It is not correct, however, to require its vertex to stay above the $Z_r$—$Z_x$-plane, i. e. to require the distance between its vertex and said plane to be greater than or equal to zero, for all real values of $$\gamma \geq 0 \text{ and all real values of } \omega,$$

because this restriction need to hold only for $Z_r$-values which are greater than or equal to zero, and it can be proved that the axis of the paraboloid never crosses the $Z_x$-axis, but projects through the $Z_r$—$Z_x$-plane only at negative or zero values of $Z_r$.

Taking these facts into account, i. e. considering only that part of the paraboloid whose projection corresponds to positive or zero values of $Z_r$, as indicated in Fig. 3, then it can be shown that an important necessary condition, always to be satisfied if the designed network is to be passive, is that for all real $\omega$:s the determinant $$(r_1r_n-r_{1n}^2)$$

must be greater than or equal to zero for real values of $\gamma$ greater than or equal to zero, i. e.

$$(r_1r_n-r_{1n}^2)\geq 0, \text{ for } \gamma\geq 0 \quad (19)$$

If we split up the $\beta$:s as follows:

$$\left.\begin{array}{l}\beta_{11}=h_1+jv_1\\ \beta_{nn}=h_n+jv_n\\ \beta_{1n}=h_{1n}+jv_{1n}\end{array}\right\} \quad (20)$$

then in an analogous manner it can be proved that for all real $\omega$:s the determinant:

$$(h_1h_n-h_{1n}^2) \text{ must be } \geq 0, \text{ for } \gamma\geq 0, \quad (21)$$

Further it can be proved that when the condition (19) is satisfied for all real $\omega$:s, then the condition (21) is necessarily also satisfied, and vice versa. In addition, it can also be proved that if $r_1$, $r_n$ and $(r_1r_n-r_{1n}^2)$ are each $\geq 0$, for $\gamma \geq 0$ and all real $\omega$:s, then $h_1$ and $h_n$ are each also $\geq 0$, for $\gamma \geq 0$, and if $h_1$, $h_n$ and $(h_1h_n-h_{1n}^2)$ are each $\geq 0$, for $\gamma \geq 0$, and all real $\omega$:s, then $r_1$ and $r_n$ are each also $\geq 0$, for $\gamma\gamma \geq 0$.

In the foregoing we have been dealing with the whole right half of the $\lambda$ plane and all mentioned positiveness conditions refer to that region. As none of the $\alpha$:s or $\beta$:s have poles to the right of the boundary, however, it is clear that each one of the functions is regular in the right half of the $\lambda$-plane. Consequently, in this region the functions fulfil the well known Cauchy's line-integral requirements making it possible for us to limit our efforts to the boundary (the imaginary axis and corresponding to $\gamma=0$) only.

Further, all the potential functions (being the real and imaginary part of each $\alpha$ and $\beta$), as well as the determinant of these parts fulfil in the right half of the $\lambda$-plane the well known Poisson's line integral requirements which means that the minimum- (as well as the maximum-) value of these functions must fall on the boundary, thus making it necessary to investigate them there only.

It has to be remembered, however, that poles of any one of the $\alpha$:s and $\beta$:s may also fall on the boundary. When this happens the functions have to be given special attention close to such points, because such poles do not show up in the real part along the boundary of the corresponding $\lambda$-function.

Thus, it is stated by Brune in his article, referred to above, that if a driving-point function has poles on the boundary, then such poles must be simple and the residue of the function at such a pole must be a positive, real, constant.

This necessity is found when expanding the $\lambda$-function between two concentric circles around and infinitesimally close to the pole into a Laurent's series and solving for the real part.

All three $\alpha$- or $\beta$-functions can readily be expanded in an analogous manner and when then solving for the real parts and applying the determinant conditions (19) or (21), respectively, then we reach the important necessary condition, applicable for a common pole on the boundary, saying that the determinant:

$$(k_1k_n-k_{1n}^2) \text{ must be real and }\geq 0 \quad (22)$$

where $k_1$, $k_n$ and $k_{1n}$ are the residues of $\alpha_{11}$, $\alpha_{nn}$ and $\alpha_{1n}$ or of $\beta_{11}$, $\beta_{nn}$ and $\beta_{1n}$ respectively, at the pole in question.

As to zeros on the boundary, it is known that such zeros of a driving-point function must be simple and that the differential coefficient of the function at the point in question must be a positive, real, non-zero constant. This condition is arrived at by expanding the function inside a small circle, surrounding the zero, into a Taylor's series and solving for the real part.

When expanding all three $\alpha$:s or $\beta$:s in the same manner and applying (19) or (21), respectively, we then reach the necessary condition saying that the determinant:

$$(q_1 q_n - q_{1n}^2) \text{ must be real and } \geq 0 \quad (23)$$

where $q_1$, $q_n$ and $q_{1n}$ are the differential coefficients of the $\alpha$:s or $\beta$:s at the zero in question.

The necessary conditions referring to zeros on the boundary are not of fundamental importance, however, because they are automatically satisfied, when the conditions summarized in the following are satisfied.

*Definition.*—The process of synthesizing a finite passive four-terminal network from a prescribed matrix whose elements are the short-circuit admittances or open-circuit impedances is, in analogy with Brune's notation when dealing with a single function, called "finding a network representation" of the matrix.

*Definition.*—If a function $f_{(\lambda)}$ is real when $\lambda$ is real, and if in addition the real part of $$f_{(\lambda)} \text{ is } \geq 0, \text{ for } \gamma \geq 0,$$

then such a function is, after Brune, called a "positive real" function. Brune also proved (see his article referred to) that such a function always can be given a net work representation.

*Definition.*—Let three functions $$f_{11(\lambda)} f_{nn(\lambda)} \text{ and } f_{1n(\lambda)},$$

each being real when $\lambda$ is real, be elements of the symmetrical square matrix:

$$\left\| \begin{matrix} f_{11(\lambda)} & f_{1n(\lambda)} \\ f_{1n(\lambda)} & f_{nn(\lambda)} \end{matrix} \right\|$$

If in this matrix the two elements which are located on the principal diagonal have such a property that the real part of each is $\geq 0$, for $\lambda \geq 0$, and if in addition:

$$\text{Re} f_{11(\lambda)} \times \text{Re} f_{nn(\lambda)} - [\text{Re} f_{1n(\lambda)}]^2 \text{ is} \geq 0, \text{ for } \gamma \geq 0$$

(where Re stands for "the real part of"), then such a mattrix is called a "positive real" matrix.

The $f_{(\lambda)}$:s may stand for either the $\alpha$:s or the $\beta$:s, having corresponding subscripts, and when considering the boundary, a "positive real" matrix is also defined by:

(*i*) No poles of the prescribed functions lie to the right of the imaginary axis in the $\lambda$-plane.

(*ii*) At poles on the imaginary axis residues of $f_{11(\lambda)}$ and $f_{nn(\lambda)}$ are finite, positive, real constants.

(*iii*) The determinant of the residues $k_1$, $k_n$ and $k_{1n}$) at a common pole on the imaginary axis, i. e.

$$(k_1 k_n - k_{1n}^2)$$

is a real constant and $\geq 0$.

(*iv*) $\text{Re} f_{11(j\omega)} \geq 0$ and $\text{Re} f_{nn(j\omega)} \geq 0$, for all real values of $\omega$.

(*v*) $\text{Re} f_{11(j\omega)} \times \text{Re} f_{nn(j\omega)} - [\text{Re} f_{1n(j\omega)}]^2 \geq 0$, for all real values of $\omega$.

Naturally, the $f_{(\lambda)}$:s must on the first hand fulfill the requirement of being real for real values of $\lambda$.

*Methods of realizing certain "positive real" matrices*

When a set of prescribed $\alpha$:s or $\beta$:s fulfil the requirements of being elements of a "positive real" matrix, in which the elements located on the principal diagonal are the two driving-point functions, then I have found that such a matrix can always be given a physical interpretation in a passive four-terminal network.

Below we shall show how to realize a "positive real" $\alpha$- or $\beta$-matrix, having the specific feature that a constant ratio exists between certain or all of its elements. The network representations of such matrices will play an important rôle as component networks in the total network representation of the total functions.

In the event that the prescribed functions happen initially to be elements of such a matrix, they fall under the items below directly.

(*a*) Let us first consider the case when the ratio between $\alpha_{11}$ and $\alpha_{1n}$ (correspondingly, the ratio between $\beta_{nn}$ and $\beta_{1n}$) is a finite, real constant (positive or negative).

From (12) it is clear that this ratio is simply the general circuit parameter D, and when considering the $\alpha$:s (say, we see that in this case the prescribed functions are:

$$\alpha_{11}, \alpha_{nn} \text{ and } \frac{\alpha_{11}}{D}$$

Suppose the prescribed functions fulfil the requirements of being elements of a "positive real" matrix corresponding to a matrix whose elements are the general circuit parameters ABCD. This latter matrix can then be split up as:

$$\left\| \begin{matrix} A & B \\ C & D \end{matrix} \right\| = \left\| \begin{matrix} \frac{1}{D} & 0 \\ 0 & D \end{matrix} \right\| \times \left\| \begin{matrix} DA & BD \\ \frac{C}{D} & 1 \end{matrix} \right\| = \left\| \begin{matrix} DA & \frac{B}{D} \\ CD & 1 \end{matrix} \right\| \times \left\| \begin{matrix} \frac{1}{D} & 0 \\ 0 & D \end{matrix} \right\| \quad (24)$$

←—Alternative I—→ ←—Alternative II—→

All component matrices of (24) we recognize immediately. The products evidently consist of a transformer matrix and a matrix specifying the L-structure shown in Fig. 4, and vice versa, for the two alternatives.

As to positiveness of the real parts, we know that:

$$\left. \begin{matrix} r_1 \geq 0, \text{ for } \gamma \geq 0 \\ r_n \geq 0, \text{ for } \gamma \geq 0 \\ \left( r_1 r_n - \frac{r_1^2}{D^2} \right) = \frac{r_1}{D^2}(D^2 r_n - r_1) \geq 0, \text{ for } \gamma \geq 0 \end{matrix} \right\} \quad (25)$$

*Alternative I*

Adding a prime to the $\alpha$:s which correspond to the L-structure, they are by the aid of (12) and (24) found to be:

$$\left. \begin{matrix} \alpha_{11}' = \alpha_{1n}' = \frac{1}{BD} = \frac{\alpha_{11}}{D^2} \\ \alpha_{nn}' = \frac{AD}{BD} = \frac{A}{B} = \alpha_{nn} \end{matrix} \right\} \quad (26)$$

Consequently, we see that $\text{Re} \alpha'_{11}$ and $\text{Re} \alpha'_{nn}$ are each $\geq 0$, for $\gamma \geq 0$.

The determinant becomes:

$$\left( \frac{r_1}{D^2} r_n - \frac{r_1^2}{D^4} \right) = \frac{r_1}{D^4}(D^2 r_n - r_1)$$

which also is $\geq 0$, for $\gamma \geq 0$, because each part of the determinant of (25) is $\geq 0$, for $\gamma \geq 0$.

Thus, the L-structure is passive and we get the passive combination shown in Fig. 5. The admittances of this structure ($Y$: s) expressed in the general circuit parameters are simply:

$$\left. \begin{matrix} Y_1 = \frac{1}{BD} \\ Y_2 = \frac{C}{D} \end{matrix} \right\} \quad (27)$$

*Alternative II*

Letting the $\alpha$:s, referring to the L-structure, in this case be $\alpha''$:s we get:

$$\left. \begin{matrix} \alpha_{11}'' = \alpha_{1n}'' = \frac{D}{B} = \alpha_{1n} D = \alpha_{11} \\ \alpha_{nn}'' = \frac{D^2 A}{B} = D^2 \alpha_{nn} \end{matrix} \right\} \quad (28)$$

Thus, $$\text{Re} \alpha_{11}'' \text{ and } \text{Re} \alpha_{nn}'' \text{ are each } \geq 0, \text{ for } \gamma \geq 0$$

The determinant which in this case becomes:

$$(r_1D^2r_n - r_1^2) = r_1(D^2r_n - r_1)$$

is also $\geq 0$, for $\gamma \geq 0$, due to (25).

Thus, we get the passive structure shown in Fig. 6, and the $Y$:$s$ are simply:

$$\left. \begin{array}{l} Y_1 = \dfrac{D}{B} \\ Y_2 = CD \end{array} \right\} \quad (29)$$

The reality clause is fulfilled, and due to the above two alternatives we can state:

If a non-singular "positive real" $\alpha$- or $\beta$-matrix is such that the general circuit parameter D, obtained from this matrix, is a finite, real (positive or negative; if negative we only transpose one pair of terminals or wind the transformer as to take care of the negative sign) constant, then this particular matrix satisfied both necessary and sufficient conditions for having a network representation in either one of the structures shown in Fig. 5 or 6.

Should, however, this parameter be unity, then the network representation of the corresponding matrix is shown in Fig. 4.

(b) Let us now consider the case when the ratio between $\alpha_{nn}$ and $\alpha_{1n}$ (correspondingly, the ratio between $\beta_{11}$ and $\beta_{1n}$) is a finite, real constant (positive or negative).

From (12) we see that this ratio simply is the general circuit parameter A, and thus in this case the prescribed functions are:

$$\alpha_{11}, \alpha_{nn} \text{ and } \frac{\alpha_{nn}}{A},$$

having the real parts:

$$r_1, r_n \text{ and } \frac{r_n}{A}.$$

As these functions are elements of a "positive real" matrix we know that:

$$\left. \begin{array}{l} r_1 \geq 0, \text{ for } \gamma \geq 0 \\ r_n \geq 0, \text{ for } \gamma \geq 0 \\ \left(r_1 r_n - \dfrac{r_n^2}{A^2}\right) = \dfrac{r_n}{A^2}(A^2 r_1 - r_n) \geq 0, \text{ for } \gamma \geq 0 \end{array} \right\} \quad (30)$$

The corresponding matrix having as elements the general circuit parameters we in this case split up as:

$$\left\|\begin{array}{l} AB \\ CD \end{array}\right\| = \left\|\begin{array}{cc} A & 0 \\ 0 & \frac{1}{A} \end{array}\right\| \times \left\|\begin{array}{cc} 1 & \frac{B}{A} \\ CA & DA \end{array}\right\| = \left\|\begin{array}{cc} 1 & AB \\ \frac{C}{A} & DA \end{array}\right\| \times \left\|\begin{array}{cc} A & 0 \\ 0 & \frac{1}{A} \end{array}\right\| \quad (31)$$

$\longleftarrow$ Alternative I $\longrightarrow$ $\longleftarrow$ Alternative II $\longrightarrow$ The matrices of Alternative I evidently characterize the structure shown in Figure 8 while the matrices of Alternative II characterize the structure shown in Figure 9.

We then proceed in an analogous manner as in the previous case, and get:

*Alternative I*

$$\left. \begin{array}{l} \alpha_{11}' = \dfrac{A^2 D}{B} = A^2 \alpha_{11} \\ \alpha_{nn}' = \alpha_{1n}' = \dfrac{A}{B} = \alpha_{nn} \end{array} \right\} \quad (32)$$

Thus,

Re $\alpha_{11}'$ and Re $\alpha_{nn}'$ are each $\geq 0$, for $\gamma \geq 0$, and the determinant:

$$(A^2 r_1 r_n - r_n^2) = r_n(A^2 r_1 - r_n) \text{ is also } \geq 0, \text{ for } \gamma \geq 0, \text{ due to (30)}.$$

Consequently, we get the passive combination shown in Fig. 8, and the $Y$:$s$ are simply:

$$\left. \begin{array}{l} Y_1 = AC \\ Y_2 = \dfrac{A}{B} \end{array} \right\} \quad (33)$$

*Alternative II*

Here we have:

$$\left. \begin{array}{l} \alpha_{11}'' = \dfrac{AD}{AB} = \dfrac{D}{B} = \alpha_{11} \\ \alpha_{nn}'' = \alpha_{1n}'' = \dfrac{1}{AB} = \dfrac{\alpha_{nn}}{A^2} \end{array} \right\} \quad (34)$$

Thus,

Re $\alpha_{11}''$ and Re $\alpha_{nn}''$ are each $\geq 0$, for $\gamma \geq 0$, and the determinant:

$$\left(\frac{r_1}{A^2} r_n - \frac{r_n^2}{A^4}\right) = \frac{r_n}{A^4}(A^2 r_1 - r_n) \text{ is also} \geq 0, \text{ for } \gamma \geq 0, \text{ due to (30)}.$$

Consequently, we get the passive combination shown in Fig. 9, and the $Y$:$s$ are simply:

$$\left. \begin{array}{l} Y_1 = \dfrac{C}{A} \\ Y_2 = \dfrac{1}{AB} \end{array} \right\} \quad (35)$$

The reality clause is fulfilled and we thus can state:

If a non-singular "positive real" $\alpha$- or $\beta$-matrix is such that the general circuit parameter A, to be obtained from this matrix, is a finite, real constant, then this specific matrix satisfies both necessary and sufficient conditions for having a network representation in either one of the structures shown in Fig. 8 or 9 with the structure shown in Fig. 7 as a special case, corresponding to unity ratio between the functions dealt with.

(c) Now we proceed to the case when in a "positive real" $\alpha$- or $\beta$-matrix the two elements located on its principal diagonal bear to each other a finite, real constant ratio. In this case we split up our matrix as:

$$\left\|\begin{array}{cc} A & B \\ C & D \end{array}\right\| = \left\|\begin{array}{cc} \sqrt{\frac{A}{D}} & 0 \\ 0 & \sqrt{\frac{D}{A}} \end{array}\right\| \times \left\|\begin{array}{cc} \sqrt{AD} & B\sqrt{\frac{D}{A}} \\ C\sqrt{\frac{A}{D}} & \sqrt{AD} \end{array}\right\| = \left\|\begin{array}{cc} \sqrt{AD} & B\sqrt{\frac{D}{A}} \\ C\sqrt{\frac{A}{D}} & \sqrt{AD} \end{array}\right\| \times \left\|\begin{array}{cc} \sqrt{\frac{A}{D}} & 0 \\ 0 & \sqrt{\frac{D}{A}} \end{array}\right\| \quad (36)$$

$\longleftarrow$ Alternative I $\longrightarrow$ $\longleftarrow$ Alternative II $\longrightarrow$ The product matrices evidently specify a transformer and a symmetrical lattice structure, and vise versa.

The given $\alpha$:$s$ (say) are in this case:

$$\alpha_{11}, \frac{A}{D}\alpha_{11} \text{ and } \alpha_{1n}$$

i. e. their real parts are $$r_1, \frac{A}{D} r_1 \text{ and } r_{1n}$$

We know that:

$$\left. \begin{array}{l} r_1 \geq 0, \text{ for } \gamma \geq 0 \\ \dfrac{A}{D} r_1 \geq 0, \text{ for } \gamma \geq 0 \\ \left(\dfrac{A}{D} r_1^2 - r_{1n}^2\right) \geq 0, \text{ for } \gamma \geq 0 \end{array} \right\} \quad (37)$$

*Alternative I*

Adding a prime to the $\alpha$:$s$ corresponding to the lattice structure matrix, then these are found to be:

$$\left. \begin{array}{l} \alpha_{11}' = \alpha_{nn}' = \alpha_{1n}'\sqrt{AD} = \dfrac{A}{B} = \alpha_{nn} = \dfrac{A}{D}\alpha_{11} \\ \alpha_{1n}' = \sqrt{\dfrac{A}{D}}\alpha_{1n} \end{array} \right\} \quad (38)$$

Thus, we see that $$\text{Re}\alpha_{11}' = \text{Re}\alpha_{nn}' \text{ is} \geq 0, \text{ for } \gamma \geq 0$$

The determinant, which in this case becomes:

$$\left(\frac{A^2}{D^2} r_1^2 - \frac{A}{D} r_{1n}^2\right) = \frac{A}{D}\left(\frac{A}{D} r_1^2 - r_{1n}^2\right)$$

is, due to (36), evidently also $\geq 0$, for $\gamma \geq 0$.

Thus, we get as network-representation the passive combination shown in Fig. 10 and the Y:s, when expressed in the general circuit parameters, are simply:

$$Y_1 = \frac{1}{B}\left(A - \sqrt{\frac{A}{D}}\right) \\ Y_2 = \frac{1}{B}\left(A + \sqrt{\frac{A}{D}}\right)$$ (39)

*Alternative II*

Let the $\alpha$:s corresponding to the lattice structure matrix in this case be $\alpha''$:s, and we get:

$$\alpha_{11}'' = \alpha_{nn}'' = \alpha_{1n}''\sqrt{AD} = \frac{D}{B} = \alpha_{11} \\ \alpha_{1n}'' = \frac{1}{B}\sqrt{\frac{D}{A}} = \sqrt{\frac{D}{A}}\alpha_{1n}$$ (40)

Thus,

Re $\alpha_{11}'' = \alpha_{nn}''$ is $\geq 0$, for $\gamma \geq 0$.

The determinant, which here becomes:

$$\left(r_1^2 - \frac{D}{A}r_{1n}^2\right) = \frac{D}{A}\left(\frac{A}{D}r_1^2 - r_{1n}^2\right)$$

is, due to (36), also $\geq 0$, for $\gamma \geq 0$.

Consequently, we get the passive combination shown in Fig. 11 and the Y:s, expressed in the general circuit parameters, are:

$$Y_1 = \frac{1}{B}\left(D - \sqrt{\frac{D}{A}}\right) \\ Y_2 = \frac{1}{B}\left(D + \sqrt{\frac{D}{A}}\right)$$ (41)

The reality clause is fulfilled, and thus we can state:

If a non-singular "positive real" $\alpha$- or $\beta$-matrix is such that the ratio between the two elements which are located on its principal diagonal, corresponding to the ratio between the general circuit parameters A and D, is a finite, real, constant, then this particular matrix satisfies both necessary and sufficient conditions for having a network representation in either one of the structures shown in Fig. 10 or 11. When said ratio is unity the lattice-structure alone is a network representation of the matrix considered.

(d) Finally, we take up the case when a "positive real" matrix is such that a constant ratio exists between any two of the three functions.

This is the case we continuously meet when applying my general methods of realization, because when removing sets of poles from the boundary, by the aid of a partial fraction expansion, any two members of the separate component families form always a constant ratio.

The simplest structure to use for this case is either one of the structures shown in Fig. 5, 6, 8 or 9.

If, in addition, the matrix is singular the above four structures, when considering the $\alpha$:s (in which case the general circuit parameter C is zero), reduce to either one of the structures shown in Fig. 12, and when considering the $\beta$:s (i. e. the general circuit parameter B is zero) they reduce to either one of the structures shown in Fig. 13.

It is evident that because functions under this item also fall under items (a), (b) and (c) any one of the structures arrived at under these items can be used as a network representation. Further, item (c) evidently falls in between items (a) and (b).

Considering Alternative II only and letting the transformer ratio $$\frac{1}{D} : 1$$

as in Fig. 6 gradually become A:1 as in Fig. 9, then it can be found that for every transformer ratio, $n$:1, between the above mentioned limits we get simple passive structures, while for $n$:s lying outside the range $$\frac{1}{D} \text{ to } A$$

generally two transformers in chain connection are coming into play and when merged together the ratio is again found to lie in between the above values. Thus, it is evident that the structures of Figs. 6 and 9 form the limits for an infinite number of equivalent networks, wherefore we can state:

If a nonsingular "positive real" $\alpha$- or $\beta$-matrix is such that any two of the three functions bear to with each other finite, real, constant ratios, then this matrix satisfies both necessary and sufficient conditions for having a network representation in any one of an infinite number of equivalent structures, with those shown in Figs. 5 and 8 or 6 and 9, respectively, as limiting cases.

At least two more structures are of great importance for realization of certain "positive real" matrices or component families whose members are elements of such a matrix. The structures referred to are the $\Pi$- and the T-(Z) structures.

(e) The $\Pi$-structure, shown in Fig. 14, can be said to "belong" to the $\alpha$:s because when expressing the Y:s in the $\alpha$:s it becomes immediately clear for which range of functions this structure can be used as a network representation, while when expressed in the $\beta$:s we get equations which we cannot look through, and vice versa as to the T-structure.

The $\alpha$:s of the $\Pi$-structure in Fig. 14 are:

$$\alpha_{11} = Y_1 + Y_3 \\ \alpha_{nn} = Y_2 + Y_3 \\ \alpha_{1n} = Y_3$$ (42)

i. e.

$$Y_1 = \alpha_{11} - \alpha_{1n} = (r_1 - r_{1n}) + j(x_1 - x_{1n}) \\ Y_2 = \alpha_{nn} - \alpha_{1n} = (r_n - r_{1n}) + j(x_n - x_{1n}) \\ Y_3 = \alpha_{1n} = r_{1n} + jx_{1n}$$ (43)

Thus, we see that if a nonsingular "positive real" $\alpha$-matrix is such that the differences $(\alpha_{11} - \alpha_{1n})$ and $(\alpha_{nn} - \alpha_{1n})$ are "positive real" functions and if in addition $\alpha_{1n}$ is a "positive real" function itself, then this particular matrix satisfies both necessary and sufficient conditions for having a network representation in a $\Pi$-structure.

(f) The T-structure, shown in Fig. 15, covers an exactly analogous range when considering the $\beta$:s. The Z:s (which all have to be "positive real" functions) of this structure are readily found to be as follows:

$$Z_1 = \beta_{11} - \beta_{1n} = (h_1 - h_{1n}) + j(v_1 - v_{1n}) \\ Z_2 = \beta_{nn} - \beta_{1n} = (h_n - h_{1n}) + j(v_n - v_{1n}) \\ Z_3 = \beta_{1n} = h_{1n} + jv_{1n}$$ (44)

Thus, if a nonsingular "positive real" $\beta$-matrix is such that the differences $(\beta_{11} - \beta_{1n})$ and $(\beta_{nn} - \beta_{1n})$ are "positive real" functions and if in addition $\beta_{1n}$ is a "positive real" function itself, then this particular matrix satisfies both necessary and sufficient conditions for having a network representation in a T- (Z-) structure.

(g) Note, the $\Pi$- and T-structures as well as the two L-structures are composed of the two structures shown in Figs. 16 and 17. The former "belongs" to the $\alpha$:s (it can not even be defined by the aid of the $\beta$:s) and is defined by the general circuit parameter matrix:

$$\begin{Vmatrix} 1 & \frac{1}{Y} \\ 0 & 1 \end{Vmatrix}$$

while the latter "belongs" to the $\beta$:s in an analogous strict manner and is defined by the general circuit parameter matrix:

$$\begin{Vmatrix} 1 & 0 \\ Y & 1 \end{Vmatrix}$$

*Standard connection diagrams for the addition of the network representations of several "positive real" component $\alpha$- or $\beta$-matrices*

Besides being confronted with such "positive real" $\alpha$- or $\beta$-matrices which can be realized in a single step into one of the structures considered we may meet a "positive real" matrix which cannot be realized in this simple manner but its elements have to be split up into several components, and while each component family may separately be realized into a known structure we need to know in addition how to connect these structures into a unit forming a total network representation of the total functions.

When considering a sum of $\alpha$-families the diagram of connections would essentially be as shown in Fig. 18, with the separate component networks connected in parallel, since they are realizations of admittance functions, and when considering a sum of $\beta$-families the diagram is essentially given by Fig. 19, with the separate component networks connected in series, since they are realizations of impedance functions.

The transformers shown at one end are included in order to force the entering and leaving currents of each component structure to be equal. For a symmetrical lattice component structure usually its transformer may be omitted, however.

The insertion of a 1:1 ratio transformer may also be omitted when being part of an unsymmetrical component structure if the entering and leaving currents in the component structure in question are equal without the transformer.

On the other hand, where the transformer ratio is different from 1:1 the transformer cannot be omitted.

Further, it cannot be omitted if therewith some part of the network representation would be shorted out, as illustrated in some of the examples in the following.

Where transformers are used, it is obvious that the transformer may be placed at either end of the component structure of which it is a part.

*General methods of realization of any "positive real" $\alpha$- or $\beta$-matrix having such properties, that it can characterize a passive four-terminal network having two kinds of elements only*

(a) We now have material enough for a complete solution of the above specific cases and start with the one when the prescribed matrix is found to have a network-representation in a purely reactive four-terminal network.

In his reactance-theorem (B. S. T. J. 1924 Vol. 3 p. 259) Foster showed that every scalar function $f_{(\lambda)}$ can be considered as being the impedance function of a passive purely reactive two-terminal network, provided all zeros and poles lie on the imaginary axis in the $\lambda$-plane and there separate each other, i. e. alternate. Such a function or its reciprocal can always be expanded into partial fractions and each term can be given a physical interpretation, whereupon these are joined together in a proper way.

In our case more conditions must be satisfied, but the reality clause and the residue conditions embodied in the "positive real" matrix definition are found to be both necessary and sufficient.

The elements of a "positive real" $\alpha$- or $\beta$-matrix falling under this item have each the general form:

$$f_{(\lambda)} = \frac{a_0\lambda^{2n} + a_2\lambda^{2n-2} + a_4\lambda^{2n-4} + \ldots + a_{2n}}{b_1\lambda^{2n-1} + b_3\lambda^{2n-3} + \ldots + b_{2n-1}\lambda} \quad (45)$$

After removal of the pole at $\infty$, (45) can be expanded into partial fractions. This is accomplished in the usual well-known manner; thus the first partial fraction, formed by dividing the numerator of (45) by its denominator, is—

$$f_{(\lambda)} = \frac{a_0}{b_1}\lambda + \frac{\left(a_2 - \frac{a_0 b_3}{b_1}\right)\lambda^{2n-2} + \ldots + \left(a_{2n-2} - \frac{a_0}{b_1}b_{2n-1}\right)\lambda^2 + a_{2n}}{\lambda(b_1\lambda^{2n-2} + b_3\lambda^{2n-4} + \ldots + b_{2n-1})} \quad (45a)$$

The denominator of the second rational fraction must then be factored. Since we know that every pole necessarily lies on the imaginary axis and that such poles must appear in complex pairs, the factors must be $\lambda$, $(\lambda+j\omega_1)$, $(\lambda-j\omega_1)$, $(\lambda+j\omega_2)$, $(\lambda-j\omega_2)$ ... etc. The fraction to the right can then be still further expanded, as will be evident to those skilled in the art. To save space we can now greatly simplify the resultant expansion by adopting an arbitrary set of coefficients, as indicated below, whereby the numerators of the fractions appear in the form generally obtained in partial fraction expansions. Thus we get:

$$f_{(\lambda)} = k\lambda + \frac{k_0}{\lambda} + \frac{k_1 + jk_1'}{\lambda + j\omega_1} + \frac{k_1 - jk_1'}{\lambda - j\omega_1} + \frac{k_2 + jk_2'}{\lambda + j\omega_2} + \ldots \quad (46)$$

which can be simplified into:

$$f_{(\lambda)} = k\lambda + \frac{k_0}{\lambda} + \frac{2k_1\lambda + 2\omega_1 k_1'}{\lambda^2 + \omega_1^2} + \frac{2k_2\lambda + 2\omega_2 k_2'}{\lambda^2 + \omega_2^2} + \ldots \quad (47)$$

Because the numerators of the fractions of (46) are found to be nothing but residues of $f_{(\lambda)}$ at respective poles (located on the imaginary axis at $\infty$, the origin, and at points corresponding to $\pm\omega_1, \pm\omega_2, \pm\omega_3 \ldots$, etc.) and because these residues, due to our necessary residue conditions, have to be real, we see that all $k'$:s must be zero, wherefore (47) goes over into:

$$f_{(\lambda)} = k\lambda + \frac{k_0}{\lambda} + \frac{2k_1\lambda}{\lambda^2 + \omega_1^2} + \frac{2k_2\lambda}{\lambda^2 + \omega_2^2} + \frac{2k_3\lambda}{\lambda^2 + \omega_3^2} + \ldots \quad (48)$$

where $k$, $k_0$, $k_1$, $k_2$, etc. are the residues of $f_{(\lambda)}$ at respective poles along the boundary.

The coefficients in (48) may be evaluated from the completed expansion of which the first step is shown in (45a). Thus from this equation it is already evident that $$k = \frac{a_0}{b_1}.$$

However, these coefficients, being residues, may also be found directly from (45). Thus since $k_0$ is the residue of $f_{(\lambda)}$ at the pole located at the origin, $$k_0 = \lim_{\lambda \to 0} \lambda f_{(\lambda)} = \frac{a_{2n}}{b_{2n-1}} \quad (48a)$$

As $f_{(\lambda)}$ may stand for any one of the three $\alpha$:s or $\beta$:s, and as each member of the same family generally has the same denominator, a similar expansion as (48) is possible for each one of them and we get, when considering the $\alpha$:s, say:

$$\left. \begin{aligned} \alpha_{11} &= k\lambda + \frac{k_0}{\lambda} + \frac{2k_1\lambda}{\lambda^2+\omega_1^2} + \frac{2k_2\lambda}{\lambda^2+\omega_2^2} + \ldots \\ \alpha_{nn} &= k'\lambda + \frac{k_0'}{\lambda} + \frac{2k_1'\lambda}{\lambda^2+\omega_1^2} + \frac{2k_2'\lambda}{\lambda^2+\omega_2^2} + \ldots \\ \alpha_{1n} &= k''\lambda + \frac{k_0''}{\lambda} + \frac{2k_1''\lambda}{\lambda^2+\omega_1^2} + \frac{2k_2''\lambda}{\lambda^2+\omega_2^2} + \ldots \end{aligned} \right\} \quad (49)$$

Here, as well as in the following when meeting similar expansions of the three $\alpha$:$s$ or $\beta$:$s$, the different columns, i. e.

$$k\lambda, k'\lambda, k''\lambda; \frac{k_0}{\lambda}, \frac{k_0'}{\lambda}, \frac{k_0''}{\lambda}; \frac{2k_1\lambda}{\lambda^2+\omega_1^2}, \frac{2k_1'\lambda}{\lambda^2+\omega_1^2}, \frac{2k_1''\lambda}{\lambda^2+\omega_1^2}, \text{etc.}$$

are called component families. The members of such a component family form elements of a component matrix and are called component $\alpha$:$s$ or component $\beta$:$s$, respectively, while the network representation of each component family is called a component network.

We now immediately see that (49) has a network representation in a structure as schematically shown in Fig. 18, and if (49) had been the expansions of the three $\beta$:$s$ then the network representation would have been a structure as schematically shown in Fig. 19, although in both cases any one of the four-terminal component networks shown in said figures may happen to be a two-terminal network.

The structure in question, whether in accordance with Fig. 18 or 19, can readily be built because any two members of each component family bear to each other a finite, real, constant ratio, i. e. each component family has a network representation in any one of an infinite number of equivalent structures.

Further, these component structures are all passive because the conditions of a "positive real" matrix, derived from the consideration of such structures, are satisfied. (Note, the only items, under the definition of such a matrix, to consider are (i), (ii), and (iii), i. e. the location of poles and the residue conditions.) Further, naturally the reality clause is fulfilled.

Thus, we can state:

If a prescribed "positive real" $\alpha$- or $\beta$-matrix is such that all zeros and poles of its elements lie on the imaginary axis in the $\lambda$-plane, then this particular matrix satisfies both necessary and sufficient conditions for having a network representation in a purely reactive structure in a combination as shown in Fig. 18 or 19, respectively.

For an illustration, consider the elements of a "positive real" matrix:

$$\left.\begin{array}{l} f_{11}(\lambda) = \frac{15\lambda^6+89\lambda^4+87\lambda^2+9}{2\lambda^5+8\lambda^3+6\lambda} \\ f_{nn}(\lambda) = \frac{19\lambda^6+91\lambda^4+97\lambda^2+9}{2\lambda^5+8\lambda^3+6\lambda} \\ f_{1n}(\lambda) = \frac{8\lambda^6+30\lambda^4+36\lambda^2+6}{2\lambda^5+8\lambda^3+6\lambda} \end{array}\right\}$$

The above functions fulfill all requirements of this item and after expansion according to (49) they become:

$$\left.\begin{array}{l} f_{11}(\lambda) = \frac{15}{2}\lambda + \frac{3}{2\lambda} + \frac{\lambda}{\lambda^2+1} + \frac{12\lambda}{\lambda^2+3} \\ f_{nn}(\lambda) = \frac{19}{2}\lambda + \frac{3}{2\lambda} + \frac{4\lambda}{\lambda^2+1} + \frac{2\lambda}{\lambda^2+3} \\ f_{1n}(\lambda) = 4\lambda + \frac{1}{\lambda} + \frac{2\lambda}{\lambda^2+1} - \frac{4\lambda}{\lambda^2+3} \end{array}\right\}$$

(1) Suppose the $f$:$s$ are the three short-circuit admittances (the $\alpha$:$s$).

Thus we have:

$$\alpha_{11} = \frac{15}{2}\lambda + \frac{3}{2\lambda} + \frac{\lambda}{\lambda^2+1} + \frac{12\lambda}{\lambda^2+3} = \alpha_{11}' + \alpha_{11}'' + \alpha_{11}''' + \alpha_{11}'^{\text{v}}$$

$$\alpha_{nn} = \frac{19}{2}\lambda + \frac{3}{2\lambda} + \frac{4\lambda}{\lambda^2+1} + \frac{2\lambda}{\lambda^2+3} = \alpha_{nn}' + \alpha_{nn}'' + \alpha_{nn}''' + \alpha_{nn}'^{\text{v}}$$

$$\alpha_{1n} = 4\lambda + \frac{1}{\lambda} + \frac{2\lambda}{\lambda^2+1} - \frac{4\lambda}{\lambda^2+3} = \alpha_{1n}' + \alpha_{1n}'' + \alpha_{1n}''' + \alpha_{1n}'^{\text{v}}$$

Let us choose a $\Pi$-structure for the left component family, that is $\alpha_{11}'$, $\alpha_{nn}'$ and $\alpha_{1n}'$. The capacitances of that structure then are (from (43) page 7) found as shown below:

$$Y_1 = \alpha_{11}' - \alpha_{1n}' = \frac{15}{2}\lambda - 4\lambda = \frac{7}{2}\lambda, \text{ i. e. } C_1 = \frac{7}{2}$$

$$Y_2 = \alpha_{nn}' - \alpha_{1n}' = \frac{19}{2}\lambda - 4\lambda = \frac{11}{2}\lambda, \text{ i. e. } C_2 = \frac{11}{2}$$

$$Y_3 = \alpha_{1n}' = 4\lambda, \text{ i. e. } C_3 = 4.$$

The functions are used as they stand, so the ratio of the transformer will be 1:1.

In the second component family the driving point functions are equal, so that we may most conveniently use a symmetrical lattice structure such as is shown in Fig. 10; but since the structure will be symmetrical, the transformer may be omitted. Thus, dealing with the $Y$:$s$, we have:

$$Y_1 = \alpha_{11}'' - \alpha_{1n}'' = \frac{3}{2\lambda} - \frac{1}{\lambda} = \frac{1}{2\lambda}$$

$$Y_2 = \alpha_{11}'' + \alpha_{1n}'' = \frac{3}{2\lambda} + \frac{1}{\lambda} = \frac{1}{\frac{2}{5}\lambda}.$$

i. e. $L_1$ is 2 and $L_2$ is 2/5.

For the third component family the general circuit parameter C is zero, as can be seen from (12) page 3. On the other hand, the network representation of this family cannot be like that shown in Fig. 16 because all the functions are not equal. A transformer is required and the structure selected is shown in Fig. 5, in which $Y_2$, however, is zero as is evident from (27) page 5. The ratio of the transformer and $Y_1$ are found with the help of (12) page 3 and (27) page 5. Thus $$\frac{1}{D}:1 = \frac{\alpha_{1n}'''}{\alpha_{11}'''}:1 = 2:1 \text{ and } Y_1 = \frac{1}{BD} = \frac{(\alpha_{1n}''')^2}{\alpha_{11}'''} = \frac{4\lambda}{\lambda^2+1}.$$

Turning this expression upside down, the corresponding impedance—

$$z_1 \text{ is} = \frac{\lambda^2+1}{4\lambda} = \frac{\lambda}{4} + \frac{1}{4\lambda},$$

which stands for an inductance—

$$\left(L = \frac{1}{4}\right)$$

in series with a condenser $(C=4)$.

We now come to the last component family. Let us again select a structure like that in Fig. 5. Then we get $$\frac{1}{D}:1 = \frac{\alpha_{1n}'^{\text{v}}}{\alpha_{11}'^{\text{v}}} = \frac{1}{3}:1, \text{ i. e. 1:3}.$$

$$Y_1 = \frac{1}{BD} = \frac{(\alpha_{1n}'^{\text{v}})^2}{\alpha_{11}'^{\text{v}}} = \frac{4\lambda}{3\lambda^2+9},$$

i. e. the corresponding impedance $$Z_1 \text{ is} = \frac{3\lambda^2+9}{4\lambda} = \frac{3}{4}\lambda + \frac{1}{4/9\lambda},$$

which means an inductance—

$$\left(L = \frac{3}{4}\right)$$

in series with a condenser $$\left(C = \frac{4}{9}\right).$$

$$Y_2 = \frac{C}{D} = \frac{\alpha_{11}'^{\text{v}}\alpha_{nn}'^{\text{v}} - (\alpha_{1n}'^{\text{v}})^2}{\alpha_{11}'^{\text{v}}} = \frac{2\lambda}{3\lambda^2+9},$$

i. e. the corresponding impedance $$Z_2 \text{ is} = \frac{3\lambda^2+9}{2\lambda} = \frac{3}{2}\lambda + \frac{1}{2/9\lambda},$$

which means an inductance ($L=3/2$) in series with a condenser $$\left(C = \frac{2}{9}\right).$$

Since the functions were assumed to be admittance functions, the four component structures must be connected in parallel as shown in Fig. 20.

The above example has been worked out in detail to show clearly the steps to be followed in actually realizing the component families of terms resulting from the expansion of the functions. In the subsequent examples an analogous procedure is to be employed as will be apparent to those skilled in the art.

Note the necessity of the transformers as indicated. Those having ratios different from 1:1 must under all circumstances stay in. Further, should here the 1:1 transformer contained in the upper component structure be omitted then the inductance-coil of the lower horizontal arm of the symmetrical lattice structure would be shorted out, and the structure as a whole would not be a network representation of the total prescribed $\alpha$-functions.

(2) Now, suppose the $f$:$s$ are the three open-circuit impedances (the $\beta$:$s$).

Then, the network-representation is, for instance, the one shown in Fig. 21.

Again, note here the necessity of the transformers. Should in this case the 1:1 transformer be omitted then the condenser of the upper horizontal arm of the symmetrical lattice structure would be shorted out, and again the total structure would not be a true network representation of the total functions.

(b) The above method of realization can readily be extended to all those "positive real" $\alpha$- or $\beta$-matrices whose elements are such that all their poles lie on the negative real axis, where the zeros of the elements located on the principal diagonal also lie. These zeros and poles mutually separate each other. On the other hand, the zeros of the elements located on the "secondary" diagonal lie anywhere on the real axis.

First, consider the case when the sequence of zeros and poles of the elements located on the principal diagonal of a "positive real" $\alpha$- or $\beta$-matrix is proceeding from and including the origin, thus: zero—pole—zero—pole—, etc.

Let us start out from function (45) and transform it into a form corresponding to the case considered here.

Thus, multiply its expansion, i. e. (48), by $\lambda$ on both sides of the equality sign, getting:

$$\lambda f_{(\lambda)} = k\lambda^2 + k_0 + \frac{2k_1\lambda^2}{\lambda^2+\omega_1^2} + \frac{2k_2\lambda^2}{\lambda^2+\omega_2^2} + \ldots \quad (50)$$

Then, substituting $\lambda^2 = \lambda'$ and writing A:$s$ in place of $k$:$s$ and $c$:$s$ in place of $\omega^2$:$s$, we have:

$$\lambda f_{(\lambda)} = A\lambda' + A_0 + \frac{2A_1\lambda'}{\lambda'+c_1} + \frac{2A_2\lambda'}{\lambda'+c_2} + \ldots \quad (51)$$

By these two procedures we have removed the pole from the origin and have moved all zeros and poles from the imaginary axis to the negative real axis, thereby reducing their number by half, as indicated in Fig. 22, and if (48) stands for a driving-point function of a purely reactive structure, then the separation property is still fulfilled by zeros and poles of (51), which function thus may represent the driving-point function of a dissipative structure having only two kinds of elements. All zeros and poles lie now, however, on the negative real axis in a sequence proceeding from and including the origin, thus: zero—pole—zero—pole, etc. Note that the constant $A_0$ is nothing more than the ratio of the constant terms of the numerator and denominator of the original function before expansion. Naturally, if there is no constant term in the numerator of the original function, then $A_0$ will not appear. Further, note the form of the fractions in the expansion. The function must, in this case, be expanded in the manner shown.

$\lambda f_{(\lambda)}$ is our new function, and, as all $\alpha$:$s$ or $\beta$:$s$ can be expanded in an analogous manner, we get, when dropping the prime of $\lambda$ and considering a set of $\alpha$:$s$ (say), the system of equations:

$$\left.\begin{aligned}\alpha_{11} &= A\lambda + A_0 + \frac{2A_1\lambda}{\lambda+c_1} + \frac{2A_2\lambda}{\lambda+c_2} + \ldots \\ \alpha_{nn} &= B\lambda + B_0 + \frac{2B_1\lambda}{\lambda+c_1} + \frac{2B_2\lambda}{\lambda+c_2} + \ldots \\ \alpha_{1n} &= C\lambda + C_0 + \frac{2C_1\lambda}{\lambda+c_1} + \frac{2C_2\lambda}{\lambda+c_2} + \ldots\end{aligned}\right\} \quad (52)$$

The A:$s$, B:$s$, C:$s$ and $c$:$s$ in (52) are numerically the same as the $k$:$s$, $k'$:$s$, $k''$:$s$ and $\omega^2$:$s$, respectively, of (49), though their significance is changed, because of the A:$s$, B:$s$ and C:$s$, only those of the left component family (A$\lambda$, B$\lambda$, C$\lambda$) are residues. The others are real constants only. Further, while the $\omega$:$s$ represented conjugate points along the imaginary axis the $c$:$s$ are single points along the negative real axis.

This, however, does not violate the fact that the functions of Equations (52), like (49), always are realizable into a combination of standard structures to be connected according to the diagram 18 as only the variable is affected by the performed transformations but not the constants. In this case, however, only resistance and capacitance elements together with needed transformers are contained in the network representation to be obtained from the above expansions.

Should (52) be a set of expanded $\beta$:$s$, then the network representation would be in accordance with diagram 19 and only resistance and inductance elements together with needed transformers are contained in the network.

In both cases any one of the component structures may happen to be a two-terminal network, however. This occurs when, in any component family, the terms corresponding to the transfer function and one of the driving-point functions are both zero.

For an illustration, consider the elements of a "positive real" $\alpha$-matrix:

$$\left.\begin{aligned}f_{11(\lambda)} &= \frac{\lambda^3+20\lambda^2+16\lambda+2}{2\lambda^2+3\lambda+1} \\ f_{nn(\lambda)} &= \frac{\lambda^3+22\lambda^2+27\lambda+8}{2\lambda^2+3\lambda+1} \\ f_{1n(\lambda)} &= \frac{\lambda^3+15\lambda^2+14\lambda+3}{2\lambda^2+3\lambda+1}\end{aligned}\right\}$$

The above functions fulfill all requirements of this item and after being expanded according to (52) they become:

$$\left.\begin{aligned}f_{11(\lambda)} &= \frac{\lambda}{2}+2+\frac{4.5\lambda}{2\lambda+1}+\frac{5\lambda}{\lambda+1} \\ f_{nn(\lambda)} &= \frac{\lambda}{2}+8+\frac{.5\lambda}{2\lambda+1}+\frac{2\lambda}{\lambda+1} \\ f_{1n(\lambda)} &= \frac{\lambda}{2}+3+\frac{1.5\lambda}{2\lambda+1}+\frac{3\lambda}{\lambda+1}\end{aligned}\right\}$$

(1) Suppose the $f$:$s$ are the three short circuit admittances (the $\alpha$:$s$).

Then, by the aid of the foregoing, their total network representation is, for instance, the one shown in Fig. 23, though naturally each one of the different component-structures can be replaced with some other equivalent structure.

The upper structure, for instance, could as well have been selected as a symmetrical one having equal admittances in each of the two horizontal branches.

If symmetrical or not its 1:1 ratio transformer may in this case be omitted.

(2) Now, suppose the $f$:$s$ are the three open-circuit impedances (the $\beta$:$s$).

Then, the network representation is, for instance, the one shown in Fig. 24, though again some of the different component structures can be replaced with some other equivalent structures. Also in this case the 1:1 transformer may be omitted.

(c) Let us now consider the case when the sequence of zeros and poles of the elements located on the principal diagonal of a "positive real" $\alpha$- or $\beta$-matrix is proceeding from and including the origin, thus: pole—zero—pole—zero—etc., along the negative real axis.

Again we start out from function (45) and transform it into a form corresponding to the case considered here. Thus, in this case divide the expansion of (45), i. e. (48), by $\lambda$ on both sides of the equality sign.

Then, substitute $\lambda^2 = \lambda'$ and write $A$:$s$ in place of $k$:$s$ and $c$:$s$ in place of $\omega^2$:$s$, and we get:

$$\frac{f(\lambda)}{\lambda} = A + \frac{A_1}{\lambda'} + \frac{2A_1}{\lambda'+c_1} + \frac{2A_2}{\lambda'+c_2} + \cdots \quad (53)$$

Thus, $$\frac{f(\lambda)}{\lambda}$$

is our new function, and, dropping the prime and expanding all three $\alpha$:$s$ (say) in an analogous manner, we obtain:

$$\left.\begin{array}{l} \alpha_{11} = A + \dfrac{A_0}{\lambda} + \dfrac{2A_1}{\lambda+c_1} + \dfrac{2A_2}{\lambda+c_2} + \cdots \\ \alpha_{nn} = B + \dfrac{B_0}{\lambda} + \dfrac{2B_1}{\lambda+c_1} + \dfrac{2B_2}{\lambda+c_2} + \cdots \\ \alpha_{1n} = C + \dfrac{C_0}{\lambda} + \dfrac{2C_1}{\lambda+c_1} + \dfrac{2C_2}{\lambda+c_2} + \cdots \end{array}\right\} \quad (54)$$

Here a similar discussion as given under item (b) applies, but note that in this case the numerators of all fractions containing $\lambda$ in the denominator are residues. Also note that here the constant terms (A, B, C) are simply the ratios of the coefficients of the highest equal powers of $\lambda$ in the numerator and denominator of the original functions. It is clear that, if $\alpha$:$s$, the functions characterize a four-terminal network having only resistance and inductance elements together with needed transformers, and if $\beta$:$s$ then the functions of (54) characterize a four-terminal network having only resistance and capacitance elements plus needed transformers.

If $\alpha$:$s$, the total network representation will substantially be in accordance with the diagram in Fig. 18 and if $\beta$:$s$ substantially in accordance with the diagram in Fig. 19, though any one of the component networks may happen to be a two-terminal network, however, as under the preceding item (b).

For an illustration, consider the elements of a "positive real" matrix:

$$\left.\begin{array}{l} f_{11}(\lambda) = \dfrac{4\lambda^3 + 18\lambda^2 + 18\lambda + 2}{2\lambda^3 + 5\lambda^2 + 2\lambda} \\ f_{nn}(\lambda) = \dfrac{16\lambda^3 + 57\lambda^2 + 49\lambda + 10}{2\lambda^3 + 5\lambda^2 + 2\lambda} \\ f_{1n}(\lambda) = \dfrac{6\lambda^3 + 24.2\lambda^2 + 23.4\lambda + 4}{2\lambda^3 + 5\lambda^2 + 2\lambda} \end{array}\right\}$$

The above functions fulfill all requirements of this item and after being expanded according to (54) they become:

$$\left.\begin{array}{l} f_{11}(\lambda) = \dfrac{1}{\lambda} + 2 + \dfrac{4}{2\lambda+1} + \dfrac{1}{\lambda+2} \\ f_{nn}(\lambda) = \dfrac{5}{\lambda} + 8 + \dfrac{3}{2\lambda+1} + \dfrac{2}{\lambda+2} \\ f_{1n}(\lambda) = \dfrac{2}{\lambda} + 3 + \dfrac{3.2}{2\lambda+1} + \dfrac{1}{\lambda+2} \end{array}\right\}$$

(1) Suppose the $f$:$s$ are the three short-circuit admittances (the $\alpha$:$s$).

Then, their total network representation is, for instance, the one shown in Fig. 25, though again naturally other component structures could have been selected. The 1:1 transformer contained in the lower component-structure may in this case be omitted.

(2) Now, suppose the $f$:$s$ are the three open-circuit impedances (the $\beta$:$s$).

Figure 26:
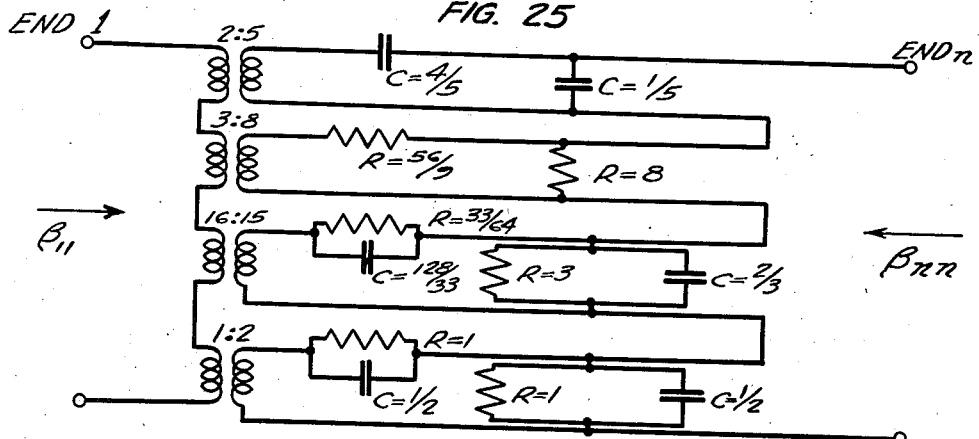

Then, the network representation is, for instance, the one shown in Fig. 26. Again different component structures could have been selected, but note that if using those as indicated all transformers must stay in because each one has a ratio different from 1:1. Had the other L-structure been selected for the lower component structure, then the ratio of its transformer would have become 1:1 and could have been omitted.

With the content of the last two items in mind, and remembering that, naturally, the reality clause is met with, we can now state:

If a positive real $\alpha$- or $\beta$-matrix is such that the zeros and poles of the elements located on its principal diagonal lie on the negative real axis and have there separation property; the poles of the elements located on the "secondary" diagonal lie also there, while zeros of these latter elements lie anywhere along the real axis, then this particular matrix satisfies both necessary and sufficient conditions for having a network representation in a dissipative four-terminal network having only two kinds of network elements.

*Definitions.*—In this specification and the claims the following terms are to be understood as follows:

A finite network is one having a finite number of meshes.

A two-terminal network is one having only one input terminal and only one output terminal.

A four-terminal network is one having one pair of input terminals and one pair of output terminals.

A passive network is one which under no conditions can generate energy.

A symmetrical four-terminal network is a network whose diagram of connections does not change if turned over 180 degrees in two directions, 90 degrees in respect to each other (note a four-terminal network having equal driving-point functions need not necessarily be symmetrical).

In summary, it will be evident that I have provided a method of the design of finite four-terminal electrical networks having prescribed characteristics, namely two driving-point functions and a transfer function which are functions of frequency and elements of a positive real matrix, all the zeros and poles of such functions lying on the imaginary axis in the complex $\lambda$-plane and there alternate. The resultant networks are characterized by the fact that they contain purely reactive elements only.

As an extension of this method I have also described its application to a second group of driving-point and transfer functions in which all the poles of said functions and all zeros of the driving-point functions lie on the negative real axis of the complex $\lambda$-plane in a sequence which is alike for the zeros and poles of each driving-point function, proceeding from and including the origin, and such that the zeros and poles separate each other, while the zeros of the transfer function lie anywhere on the real axis in the said plane. Functions of this type characterize networks which are dissipative but contain only two kinds of network elements, that is either inductance and resistance or capacitance and resistance. Whether the network shall contain the former or the latter combination of elements depends upon the sequence of the zeros and poles of the driving-point functions, that is whether there is a pole or a zero at the origin or nearest the origin. The methods of designing the network corresponding to these three classes of functions are dealt with in detail in the specification under (a), (b), and (c), respectively, under the heading (page 32) "General methods of realization of any positive real α or β matrix having such properties that it can characterize a passive four-terminal network having two kinds of elements only".

Prior to this under the heading (page (5) "Methods of realizing certain positive real matrices", I have described in detail the manner of realizing simple four-terminal networks from various types of positive real matrices or component families whose members are elements of such a matrix having the specific feature that a constant ratio exists between certain or all of its elements.

These simple networks are well-known structures such as the T-structure, Π-structure, L-structure, lattice structure, etc.; and while my method of realizing such structures may be new, I do not claim these network structures as my invention. However, the network structures characterized by functions which, when expanded, are composed of a plurality of such matrices or component families and which structures comprise a plurality of component four-terminal networks, I do claim as my invention within the limits set forth in the appended claims.

As has been said above, the invention described in this specification relates only to networks containing only two kinds of lumped network elements. The methods herein described are insufficient for the realization of networks containing all three kinds of network elements, i. e. inductance, capacitance and resistance. The realization of functions characterizing this type of network is described in my copending application Serial No. 609,429.

By parallel connection and series connection, respectively, of four-terminal networks is to be understood that the same type of connection is employed at both ends, that is, both the input terminals and the output terminals of the networks under consideration are connected in parallel or in series, respectively, as clearly shown, for example, in Figs. 18 and 19. In the event that one of the component networks is a two-terminal network which must be connected in parallel or in series with one or more four-terminal networks, the two terminals of the former are treated as if they were either the input terminals or the output terminals (as the case may be) of a four-terminal network, that is the two terminals are connected in parallel or in series with the input (or the output) terminals of the component four-terminal networks, depending upon the terminals to which the driving point function of which the two-terminal network is a network representation refers.

Having now described my invention, I claim:

1. A finite, four-terminal electrical network, containing lumped network elements and having prescribed characteristics, said network comprising a plurality of component networks, all being connected in parallel with each other; the driving-point functions and the transfer function of each of the successive component networks being substantially equal to the respective terms of the corresponding component family in partial fraction expansions of the prescribed driving-point functions and transfer function of the total four-terminal network.

2. A finite, four-terminal electrical network, containing lumped network elements and having prescribed characteristics, said network comprising a plurality of component networks, all being connected in series with each other; the driving-point functions and the transfer function of each one of the successive component networks being substantially equal to the respective terms of the corresponding component family in partial fraction expansions of the prescribed driving-point functions and transfer function of the total four-terminal network.

3. A finite four-terminal electrical network, containing lumped network elements, comprising a plurality of component networks; the driving-point functions and the transfer function of each of the successive component networks being substantially equal to the respective terms of the corresponding component family in partial fraction expansions of the driving-point functions and the transfer function of the total four-terminal network; all the component networks being connected in parallel with each other.

4. A finite four-terminal electrical network, containing lumped network elements, comprising a plurality of component networks; the driving-point functions and the transfer function of each one of the successive component networks being substantially equal to the respective terms of the corresponding component family in partial fraction expansions of the driving-point functions and the transfer function of the total four-terminal network, all the component networks being connected in series with each other.

5. A finite four-terminal electrical network, containing lumped network elements, comprising a plurality of component networks, all connected in parallel with each other; the short-circuit driving-point admittances and the short-circuit transfer admittance of each of the successive component networks being substantially equal to the respective terms of the corresponding component family in partial fraction expansions of the short-circuit driving-point admittances and the short-circuit transfer admittance of the total four-terminal network.

6. A finite four-terminal electrical network, containing lumped network elements, comprising a plurality of component networks, all connected in series with each other; the open-circuit driving-point impedances and the open-circuit transfer impedance of each of the successive component networks, being substantially equal to the respective terms of the corresponding component family in partial fraction expansions of the open-circuit driving-point impedances and the open-circuit transfer impedance of the total four-terminal network.

7. A finite four-terminal electrical network, containing only two kinds of lumped network elements, comprising a plurality of component networks; the driving-point functions and the transfer function of each of the successive component networks being substantially equal to the respective terms of the corresponding component family in partial fraction expansions of the driving-point functions and the transfer function of the total four-terminal network; all the component networks being connected in parallel with each other.

8. A finite four-terminal electrical network, containing only two kinds of lumped network elements, comprising a plurality of component networks; the driving-point functions and the transfer function of each one of the successive component networks being substantially equal to the respective terms of the corresponding component family in partial fraction expansions of the driving-point functions and the transfer function of the total four-terminal network; all the component networks being connected in series with each other.

9. A finite four-terminal electrical network structure of lumped network elements, including a plurality of four-terminal component networks and means for connecting said component networks in parallel with each other in such a manner that, when a voltage of any frequency is applied to one pair of the main terminals at either end of the total four-terminal network structure, the current entering any one of said networks as modified by said connecting means is forced to be equal to the current leaving the same network at the same end thereof, said means including one or more transformers with two windings, each transformer being associated with one of said component networks and having one winding connected across the pair of terminals at one end of said component network, the other winding being connected across the main terminals of the entire four-terminal network structure, in parallel with the corresponding windings of each of the other transformers if any at the corresponding end of the associated component networks and in parallel with the pair of terminals at the corresponding end of each of the component networks if any which are not associated with a transformer.

10. A four-terminal electrical network structure of lumped network elements, including a plurality of four-terminal component networks and means for connecting said component networks in series with each other in such a manner that when a current of any frequency is applied to one lead and taken out from the other one of one pair of the main terminals at either end of the total four-terminal network structure, the same current is forced to flow into one lead and out from the other one, of the pair of terminals at the corresponding end, of each one of the component networks as modified by said connecting means, said means including one or more transformers with two windings, each transformer being associated with one of said component networks and having one winding connected across the pair of terminals at one end of said component network, the other winding being connected in series with the corresponding windings of each of the other transformers if any at the corresponding end of the associated component networks and in a series manner with the terminals at the corresponding end of each of the component networks which are not associated with a transformer, the two ends of the series connections so made forming the two main terminals, respectively, of the total four-terminal network structure at said end.

11. A finite four-terminal electrical network, containing only two kinds of lumped network elements, comprising a plurality of component networks, all connected in parallel with each other; the short-circuit driving-point admittances and the short-circuit transfer admittance of each of the successive component networks being substantially equal to the respective terms of the corresponding component family in partial fraction expansions of the short-circuit driving-point admittances and the short-circuit transfer admittance of the total four-terminal network.

12. A finite four-terminal electrical network, containing only two kinds of lumped network elements, comprising a plurality of component networks, all connected in series with each other; the open-circuit driving-point impedances and the open-circuit transfer impedance of each of the successive component networks being substantially equal to the respective terms of the corresponding component-family in partial fraction expansions of the open-circuit driving-point impedances and the open-circuit transfer impedance of the total four-terminal network.

13. A finite, purely reactive four-terminal electrical network, containing lumped network elements, whose driving-point functions and transfer function are elements of a positive real matrix and of the general form:

$$f_{11}(\lambda) = \frac{a_0\lambda^{2n} + a_2\lambda^{2n-2} + a_4\lambda^{2n-4} + \ldots + a_{2n}}{b_1\lambda^{2n-1} + b_3\lambda^{2n-3} + b_5\lambda^{2n-5} + \ldots + b_{2n-1}\lambda}$$

$$f_{nn}(\lambda) = \frac{a_0'\lambda^{2n} + a_2'\lambda^{2n-2} + a_4'\lambda^{2n-4} + \ldots + a_{2n}'}{b_1\lambda^{2n-1} + b_3\lambda^{2n-3} + b_5\lambda^{2n-5} + \ldots + b_{2n-1}\lambda}$$

$$f_{1n}(\lambda) = \frac{a_0''\lambda^{2n} + a_2''\lambda^{2n-2} + a_4''\lambda^{2n-4} + \ldots + a_{2n}''}{b_1\lambda^{2n-1} + b_3\lambda^{2n-3} + b_5\lambda^{2n-5} + \ldots + b_{2n-1}\lambda}$$

where $f_{11(\lambda)}$ and $f_{nn(\lambda)}$ are the driving-point functions at the respective ends of said network while $f_{1n(\lambda)}$ is the transfer function between said ends, $a_0$, $a_2$ .. $a_{2n}$, $a_0'$, $a_2'$ ... $a^2{}_n{}'$, $a_0''$, $a_2''$ ... $a_{2n}''$ and $b_1$, $b_3$, ... $b_{2n-1}$ are real constants and $\lambda$ is a function of frequency; said network comprising a plurality of component networks; the driving-point functions and the transfer function of each of the successive component networks, being substantially equal to the respective terms of the corresponding component family in partial fraction expansions of said functions, said expansions being of the general form:

$$f_{11}(\lambda) = k\lambda + \frac{k_0}{\lambda} + \frac{2k_1\lambda}{\lambda^2 + \omega_1^2} + \frac{2k_2\lambda}{\lambda^2 + \omega_2^2} + \cdots$$

$$f_{nn}(\lambda) = k'\lambda + \frac{k_0'}{\lambda} + \frac{2k_1'\lambda}{\lambda^2 + \omega_1^2} + \frac{2k_2'\lambda}{\lambda^2 + \omega_2^2} + \cdots$$

$$f_{1n}(\lambda) = k''\lambda + \frac{k_0''}{\lambda} + \frac{2k_1''\lambda}{\lambda^2 + \omega_1^2} + \frac{2k_2''\lambda}{\lambda^2 + \omega_2^2} + \cdots$$

where all the $k$:s are the residues of the functions at their respective poles, and $\omega_1$, $\omega_2$, .. etc. are equal to $2\pi$ times the frequency at the respective poles; the component networks being connected in parallel with each other when being network representations of admittance functions, that is, when $f_{11(\lambda)}$, $f_{nn(\lambda)}$ and $f_{1n(\lambda)}$ represent such functions, while in series with each other when being network representations of impedance functions, that is, when $f_{11(\lambda)}$, $f_{nn(\lambda)}$ and $f_{1n(\lambda)}$ represent such functions.

14. A finite, dissipative four-terminal electrical network, containing only two kinds of lumped network-elements, whose driving-point functions and transfer function are elements of a positive real matrix; all the zeros and poles of all said functions being real and such that the sequence of the zeros and poles of each driving-point function, for increasing negative real values, is thus: zero—pole—zero—pole—, etc; said functions having the general form:

$$f_{11}(\lambda) = \frac{a_0\lambda^n + a_1\lambda^{n-1} + a_2\lambda^{n-2} + a_3\lambda^{n-3} + \ldots + a_n}{b_1\lambda^{n-1} + b_2\lambda^{n-2} + b_3\lambda^{n-3} + \ldots + b_n}$$

$$f_{nn}(\lambda) = \frac{a_0'\lambda^n + a_1'\lambda^{n-1} + a_2'\lambda^{n-2} + a_3'\lambda^{n-3} + \ldots + a_n'}{b_1\lambda^{n-1} + b_2\lambda^{n-2} + b_3\lambda^{n-3} + \ldots + b_n}$$

$$f_{1n}(\lambda) = \frac{a_0''\lambda^n + a_1''\lambda^{n-1} + a_2''\lambda^{n-2} + a_3''\lambda^{n-3} + \ldots + a_n''}{b_1\lambda^{n-1} + b_2\lambda^{n-2} + b_3\lambda^{n-3} + \ldots + b_n}$$

where $f_{11(\lambda)}$ and $f_{nn(\lambda)}$ are the driving-point functions at the respective ends of said network while $f_{1n(\lambda)}$ is the transfer function between said ends, $a_0, a_1 \ldots a_n, a_0', a_1' \ldots a_n', a_0'', a_1''$, $\ldots a_n''$ and $b_1, b_2, b_3 \ldots b_n$ are real constants, while $\lambda$ is a function of frequency; said network comprising a plurality of component networks; the driving-point functions and the transfer function of each of the successive component networks being substantially equal to the respective terms of the corresponding component family in partial fraction expansions of said functions, said expansions being of the general form:

$$f_{11(\lambda)} = A\lambda + A_0 + \frac{2A_1\lambda}{\lambda + c_1} + \frac{2A_2\lambda}{\lambda + c_2} + \ldots$$
$$f_{nn(\lambda)} = B\lambda + B_0 + \frac{2B_1\lambda}{\lambda + c_1} + \frac{2B_2\lambda}{\lambda + c_2} + \ldots$$
$$f_{1n(\lambda)} = C\lambda + C_0 + \frac{2C_1\lambda}{\lambda + c_1} + \frac{2C_2\lambda}{\lambda + c_2} + \ldots$$

where the $A$:s, $B$:s, $C$:s and $c$:s are real constants; the component networks being connected together in parallel with each other when being network representations of admittance functions, that is when $f_{11(\lambda)}$, $f_{nn(\lambda)}$ and $f_{1n(\lambda)}$ represent such functions, while in series with each other when being network representations of impedance functions, that is when $f_{11(\lambda)}$, $f_{nn(\lambda)}$ and $f_{1n(\lambda)}$ represent such functions.

15. A finite, dissipative four-terminal electrical network, containing only two kinds of lumped network-elements, whose driving-point functions and transfer function are elements of a positive real matrix; all the zeros and poles of all said functions being real and such that the sequence of the zeros and poles of each driving-point functions, for increasing negative values, is thus: pole—zero—pole—zero—, etc.; said functions having the general form:

$$f_{11(\lambda)} = \frac{a_0\lambda^n + a_1\lambda^{n-1} + a_2\lambda^{n-2} + a_3\lambda^{n-3} + \ldots + a_n}{b_0\lambda^n + b_1\lambda^{n-1} + b_2\lambda^{n-2} + b_3\lambda^{n-3} + \ldots + b_{n-1}\lambda}$$
$$f_{nn(\lambda)} = \frac{a_0'\lambda^n + a_1'\lambda^{n-1} + a_2'\lambda^{n-2} + a_3'\lambda^{n-3} + \ldots + a_n'}{b_0\lambda^n + b_1\lambda^{n-1} + b_2\lambda^{n-2} + b_3\lambda^{n-3} + \ldots + b_{n-1}\lambda}$$
$$f_{1n(\lambda)} = \frac{a_0''\lambda^n + a_1''\lambda^{n-1} + a_2''\lambda^{n-2} + a_3''\lambda^{n-3} + \ldots + a_n''}{b_0\lambda^n + b_1\lambda^{n-1} + b_2\lambda^{n-2} + b_3\lambda^{n-3} + \ldots + b_{n-1}\lambda}$$

where $f_{11(\lambda)}$ and $f_{nn(\lambda)}$ are the driving-point functions at the respective ends of said network while $f_{1n(\lambda)}$ is the transfer function between said said ends, $a_0, a_1 \ldots a_n, a_0', a_1' \ldots a_n', a_0''$, $a_1'' \ldots a_n''$ and $b_1, b_2, b_3 \ldots b_n$ are real constants, while $\lambda$ is a function of frequency; said network comprising a plurality of component networks; the driving-point functions and the transfer function of each of the successive component networks being substantially equal to the respective terms of the corresponding component family in partial fraction expansions of said functions, said expansions being of the general form:

$$f_{11(\lambda)} = A + \frac{A_0}{\lambda} + \frac{2A_1}{\lambda + c_1} + \frac{2A_2}{\lambda + c_2} + \ldots$$
$$f_{nn(\lambda)} = B + \frac{B_0}{\lambda} + \frac{2B_1}{\lambda + c_1} + \frac{2B_2}{\lambda + c_2} + \ldots$$
$$f_{1n(\lambda)} = C + \frac{C_0}{\lambda} + \frac{2C_1}{\lambda + c_1} + \frac{2C_2}{\lambda + c_2} + \ldots$$

where the $A$:s, $B$:s, $C$:s and $c$:s are real constants; the component networks being connected together in parallel with each other when being network representations of admittance functions, that is when $f_{11(\lambda)}$ and $f_{1n(\lambda)}$, $f_{nn(\lambda)}$ represent such functions, while in series with each other when being network representations of impedance functions, that is, when $f_{11(\lambda)}$, $f_{nn(\lambda)}$ and $f_{1n(\lambda)}$ represent such functions.

16. A finite four-terminal electrical network, of lumped network elements, including a plurality of four-terminal networks and means, including one or more transformers, for connecting said networks in parallel with each other in such a manner that, when a voltage of any frequency is applied to one pair of the main terminals at either end of the total four-terminal network, the current entering any one of said networks as modified by the addition of said transformers is forced to be equal to the current leaving the same network at the same end thereof.

17. A finite four-terminal electrical network, of lumped network elements, including a plurality of four-terminal networks and means, including one or more transformers, for connecting said networks in series with each other in such a manner that, when a current of any frequency is applied to one lead and taken out from the other one of one pair of the main terminals at either end of the total four-terminal network, the same current is forced to flow into one lead and out from the other one, of the pair of terminals at the corresponding end, of each one of the component networks as modified by the addition of said transformers.

18. A finite four-terminal electrical network, of only two kinds of lumped network elements, comprising a plurality of component networks, all connected in parallel with each other; the short-circuit driving-point admittances and the short-circuit transfer admittance of each of the successive component networks being substantially equal to the respective terms of the corresponding component family in partial fraction expansions of the three short-circuit admittances of the total four-terminal network; at least one of the component networks being a four-terminal network; said parallel connection of four-terminal component networks being, at one end thereof, made by the aid of transformers; a maximum of two of said component networks containing each only one kind of network elements.

19. A finite four-terminal electrical network, of only two kinds of lumped network elements, comprising a plurality of component networks, all connected in series with each other; the open-circuit driving-point impedances and the open-circuit transfer impedance of each of the successive component networks being substantially equal to the respective terms of the corresponding component family in partial fraction expansions of the three open-circuit impedances of the total four-terminal network; at least one of the component networks being a four-terminal network; said series connection of four-terminal component networks being, at one end thereof, made by the aid of transformers; a maximum of two of said component networks containing each only one kind of network elements.

20. A finite four-terminal electrical network, containing only two kinds of lumped network elements, comprising a plurality of component networks, all connected in parallel with each other; the short-circuit driving-point admittances and the short-circuit transfer admittance of each of the successive component networks being substantially equal to the respective terms of the corresponding component family in partial fraction expansions of the short-circuit driving-point admittances and the short-circuit transfer admittance of the total four-terminal network; at least two of the component networks being non-symmetrical four-terminal networks and at least one transformer included in the total structure.

21. A finite four-terminal electrical network, containing only two kinds of lumped network elements, comprising a plurality of component networks, all connected in series with each other; the open-circuit driving-point impedances and the open-circuit transfer impedance of each of the successive component networks being substantially equal to the respective terms of the corresponding component family in partial fraction expansions of the open-circuit driving-point impedances and the open-circuit transfer impedance of the total four-terminal network; at least two of the component networks being non-symmetrical four-terminal networks and at least one transformer included in the total structure.

22. A finite four-terminal electrical network, containing only two kinds of lumped network elements, comprising a plurality of component networks, all connected in parallel with each other; the short-circuit driving-point admittances and the short-circuit transfer admittance of each of the successive component networks being substantially equal to the respective terms of the corresponding component family in partial fraction expansions of the short-circuit driving-point admittances and the short-circuit transfer admittance of the total four-terminal network; at least two of the component networks being four-terminal networks and at most two of the component networks containing each only one kind of network elements; said parallel connection of the component networks being formed by the aid of at least one transformer.

23. A finite four-terminal electrical network, containing only two kinds of lumped network elements, comprising a plurality of component networks, all connected in series with each other; the open-circuit driving-point impedances and the open-circuit transfer impedance of each of the successive component networks being substantially equal to the respective terms of the corresponding component family in partial fraction expansions of the open-circuit driving-point impedances and the open-circuit transfer impedance of the total four-terminal network; at least two of the component networks being four-terminal networks and at most two of the component networks containing each only one kind of network elements; said series connection of the component networks being formed by the aid of at least one transformer.

24. A finite, purely reactive four-terminal electrical network, of two kinds of lumped network elements, comprising a plurality of component networks, all connected in parallel with each other; the short-circuit driving-point admittances and the short-circuit transfer admittance of each of the successive component networks being substantially equal to the respective terms of the corresponding component family in partial fraction expansions of the short-circuit driving-point admittances and the short-circuit transfer admittance of the total four-terminal network; at least one of the component networks being a four-terminal network and at most two of the component networks containing each only one kind of network elements; the total four-terminal network containing at least one transformer.

25. A finite, purely reactive four-terminal electrical network, of two kinds of lumped network elements, comprising a plurality of component networks, all connected in series with each other; the open-circuit driving-point impedances and the open-circuit transfer impedance of each of the successive component networks being substantially equal to the respective terms of the corresponding component family in partial fraction expansions of the open-circuit driving-point impedances and the open-circuit transfer impedance of the total four-terminal network; at least one of the component networks being a four-terminal network and at most two of the component networks containing each only one kind of network elements; the total four-terminal network containing at least one transformer.

26. A method of synthesizing any finite, purely reactive four-terminal electrical network, of lumped network elements, whose two driving-point functions, $f_{11(\lambda)}$ and $f_{nn(\lambda)}$, (short-circuit driving-point admittances or open-circuit driving-point impedances, respectively) and transfer function, $f_{1n(\lambda)}$, (short-circuit transfer admittance or open-circuit transfer impedance, respectively) are prescribed functions of frequency and elements of a positive real matrix, all zeros and poles of said functions lying on the imaginary axis in the complex $\lambda$-plane; said method being characterized by expanding each separate function into partial fractions according to the general scheme:

$$f_{11(\lambda)} = k\lambda + \frac{k_0}{\lambda} + \frac{2k_1\lambda}{\lambda^2+\omega_1^2} + \frac{2k_2\lambda}{\lambda^2+\omega_2^2} + \cdots$$

$$f_{nn(\lambda)} = k'\lambda + \frac{k_0'}{\lambda} + \frac{2k_1'\lambda}{\lambda^2+\omega_1^2} + \frac{2k_2'\lambda}{\lambda^2+\omega_2^2} + \cdots$$

$$f_{1n(\lambda)} = k''\lambda + \frac{k_0''}{\lambda} + \frac{2k_1''\lambda}{\lambda^2+\omega_1^2} + \frac{2k_2''\lambda}{\lambda^2+\omega_2^2} + \cdots$$

where the coefficients of $\lambda$ in the first component family and the numerators of the second component family as well as all the coefficients of $\lambda$ in the numerators of all the rest of component families are real constants, $\lambda$ being a function of frequency and $\omega$ being equal to $2\pi$ times the frequency for the corresponding conjugate pair of poles on the imaginary axis; realizing each separate component family, present, into a component structure and connecting all the component structures, when necessary by means of transformers, together in parallel with each other when being network representations of a sum of component families of admittance functions, while in series with each other when being network representations of a sum of component families of impedance functions, respectively.

27. A method of synthesizing any finite, dissipative four-terminal electrical network, of only two kinds of lumped network elements, whose two driving-point functions, $f_{11(\lambda)}$ and $f_{nn(\lambda)}$, (short-circuit driving-point admittances or open-circuit driving-point impedances, respectively) and transfer function, $f_{1n(\lambda)}$, (short-circuit transfer admittance or open-circuit transfer impedance, respectively) are prescribed functions of frequency and elements of a positive real matrix; all poles of all said functions and all zeros of said driving-point functions lying on the negative real axis in the complex $\lambda$-plane and in a sequence, which is alike for the zeros and poles of each driving-point function, proceeding from and including the origin, thus: zero—pole—zero—pole, etc., while the zeros of the transfer function lie anywhere on the real axis in said plane; said method being characterized by expanding each separate function into partial fractions according to the general scheme:

$$f_{11}(\lambda) = A\lambda + A_0 + \frac{2A_1\lambda}{\lambda+c_1} + \frac{2A_2\lambda}{\lambda+c_2} + \ldots$$
$$f_{nn}(\lambda) = B\lambda + B_0 + \frac{2B_1\lambda}{\lambda+c_1} + \frac{2B_2\lambda}{\lambda+c_2} + \ldots$$
$$f_{1n}(\lambda) = C\lambda + C_0 + \frac{2C_1\lambda}{\lambda+c_1} + \frac{2C_2\lambda}{\lambda+c_2} + \ldots$$

where $\lambda$ is a function of frequency while all other quantities are real constants, $A_0$, $B_0$ and $C_0$ being the ratios, respectively, of the constant term of the numerator and that of the denominator of the separate functions before being expanded; realizing each separate component family, present, into a component structure; connecting all the component structures, when necessary by means of transformers, together in parallel with each other, when being network representations of a sum of component families of admittance functions, while in series with each other when being network representations of a sum of component families of impedance functions; the total four-terminal network, thus designed, containing only resistance and capacitance elements in the former case, while only resistance and inductance elements in the latter case, respectively.

28. A method of synthesizing any finite, dissipative four-terminal electrical network, of only two kinds of lumped network elements, whose driving point functions, $f_{11(\lambda)}$ and $f_{nn(\lambda)}$, (short-circuit driving-point admittances or open-circuit driving-point impedances, respectively) and transfer function, $f_{1n(\lambda)}$, (short-circuit transfer admittance or open-circuit transfer impedance, respectively) are prescribed functions of frequency and elements of a positive real matrix; all poles of all said functions and all zeros of said driving-point functions lying on the negative real axis in the complex $\lambda$-plane and in a sequence, which is alike for the zeros and poles of each driving-point function, proceeding from and including the origin, thus: pole—zero—pole—zero—, etc., while the zeros of the transfer function lie anywhere on the real axis in said plane; said method being characterized by expanding each separate function into partial fractions according to the general scheme:

$$f_{11}(\lambda) = A + \frac{A_0}{\lambda} + \frac{2A_1}{\lambda+c_1} + \frac{2A_2}{\lambda+c_2} + \ldots$$
$$f_{nn}(\lambda) = B + \frac{B_0}{\lambda} + \frac{2B_1}{\lambda+c_1} + \frac{2B_2}{\lambda+c_2} + \ldots$$
$$f_{1n}(\lambda) = C + \frac{C_0}{\lambda} + \frac{2C_1}{\lambda+c_1} + \frac{2C_2}{\lambda+c_2} + \ldots$$

where $\lambda$ is a function of frequency while all other quantities are real constants, A, B and C being the ratios, respectively, of the coefficient of the highest equal power of $\lambda$ in the numerator and that of the denominator of the separate functions before being expanded; realizing each separate component family, present, into a component structure; connecting all the component structures, when necessary by means of transformers, together in parallel with each other when being network representations of a sum of component families of admittance functions, while in series with each other when being network representations of a sum of component families of impedance functions; the total four-terminal network, thus designed, containing only resistance and inductance elements in the former case while only resistance and capacitance elements in the latter case, respectively.

CHARLES M:SON GEWERTZ.